US009182813B2

(12) United States Patent
Ye et al.

(10) Patent No.: US 9,182,813 B2
(45) Date of Patent: Nov. 10, 2015

(54) IMAGE-BASED OBJECT TRACKING SYSTEM IN 3D SPACE USING CONTROLLER HAVING MULTIPLE COLOR CLUSTERS

(71) Applicant: ULSEE INC., Taipei (TW)

(72) Inventors: Zhou Ye, Foster City, CA (US); Sheng-Wen Jeng, Taipei (TW); Chih-Ming Chang, Taipei (TW); Hsin-Wei Hsiao, Taipei (TW); Yi-Chia Hsu, Tainan (TW); Ying-Ko Lu, Taoyuan County (TW)

(73) Assignee: ULSee Inc., Taipei (TW)

( * ) Notice: Subject to any disclaimer, the term of this patent is extended or adjusted under 35 U.S.C. 154(b) by 111 days.

(21) Appl. No.: 14/093,035

(22) Filed: Nov. 28, 2013

(65) Prior Publication Data

US 2014/0085194 A1      Mar. 27, 2014

Related U.S. Application Data

(63) Continuation-in-part of application No. 13/962,949, filed on Aug. 8, 2013.

(60) Provisional application No. 61/751,241, filed on Jan. 10, 2013, provisional application No. 61/681,629, filed on Aug. 10, 2012.

(51) Int. Cl.
  *G06K 9/00*    (2006.01)
  *G06F 3/01*    (2006.01)
  *G06T 7/20*    (2006.01)

(52) U.S. Cl.
  CPC .  *G06F 3/01* (2013.01); *G06T 7/204* (2013.01); *G06T 2207/10024* (2013.01); *G06T 2207/30204* (2013.01)

(58) Field of Classification Search
  USPC .......................................... 382/103, 155–161
  See application file for complete search history.

(56) References Cited

U.S. PATENT DOCUMENTS

| | | | | |
|---|---|---|---|---|
| 5,551,701 | A  * | 9/1996  | Bouton et al. | 463/36 |
| 5,724,264 | A  * | 3/1998  | Rosenberg et al. | 702/152 |
| 6,079,862 | A  * | 6/2000  | Kawashima et al. | 382/103 |
| 6,198,833 | B1 * | 3/2001  | Rangan et al. | 382/103 |
| 6,315,197 | B1 * | 11/2001 | Beardsley | 235/381 |
| 7,714,869 | B2 * | 5/2010  | Grassia et al. | 345/473 |
| 7,803,050 | B2 * | 9/2010  | Mao et al. | 463/36 |
| 8,170,945 | B2 * | 5/2012  | Longman et al. | 705/37 |
| 8,368,648 | B2 * | 2/2013  | Barney et al. | 345/158 |
| 8,672,763 | B2 * | 3/2014  | Mao et al. | 463/38 |
| 2005/0190964 | A1* | 9/2005  | Toyama | 382/159 |
| 2010/0144436 | A1* | 6/2010  | Marks et al. | 463/36 |
| 2010/0303297 | A1  | 12/2010 | Mikhailov et al. | |
| 2014/0085194 | A1* | 3/2014  | Ye et al. | 345/156 |

* cited by examiner

*Primary Examiner* — Alex Liew
(74) *Attorney, Agent, or Firm* — Alan D. Kamrath; Kamrath IP Lawfirm, P.A.

(57) ABSTRACT

Image-based object tracking system includes at least a controller with two or more color clusters, an input button, a processing unit with a camera, an object tracking algorithm and a display. Camera is configured to capture images of the controller, the processing unit is connected to display to display processed image contents, the controller is directly interacting with displayed processed image content. The controller can have two or three color clusters located on a side surface thereof and two color clusters having concentric circular areas located at a top surface thereof, the color of the first color cluster can be the same as or different from the color of the third color cluster. An object tracking method with or without scale calibration is also provided, which includes color learning and color relearning, image capturing, separating and splitting of the controller and the background, object pairing procedure steps on the controller.

20 Claims, 25 Drawing Sheets

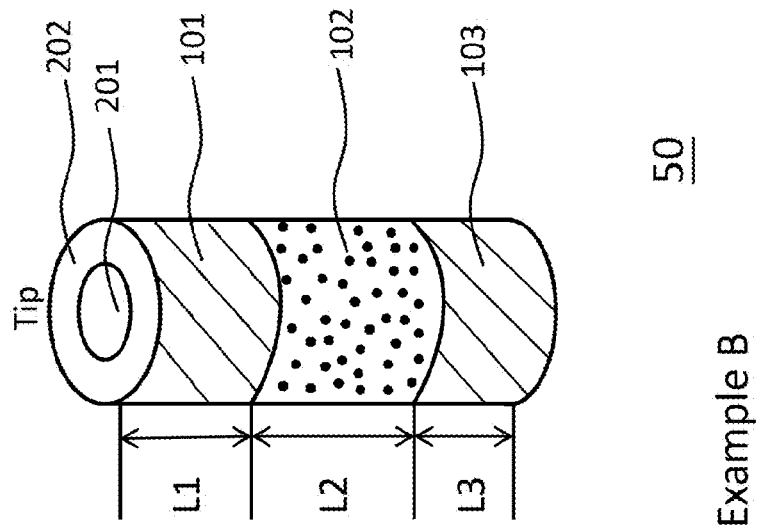
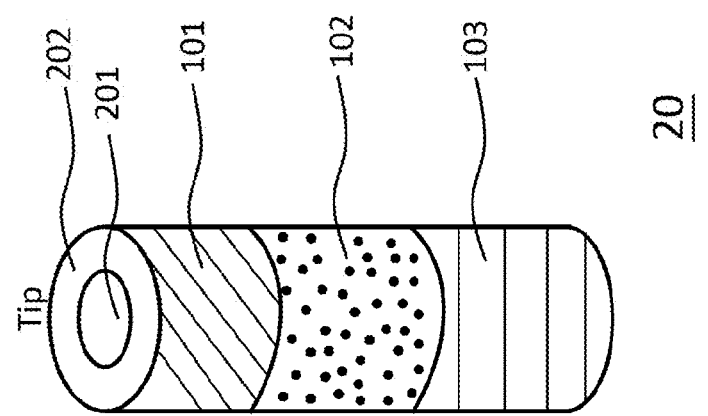
FIG. 4

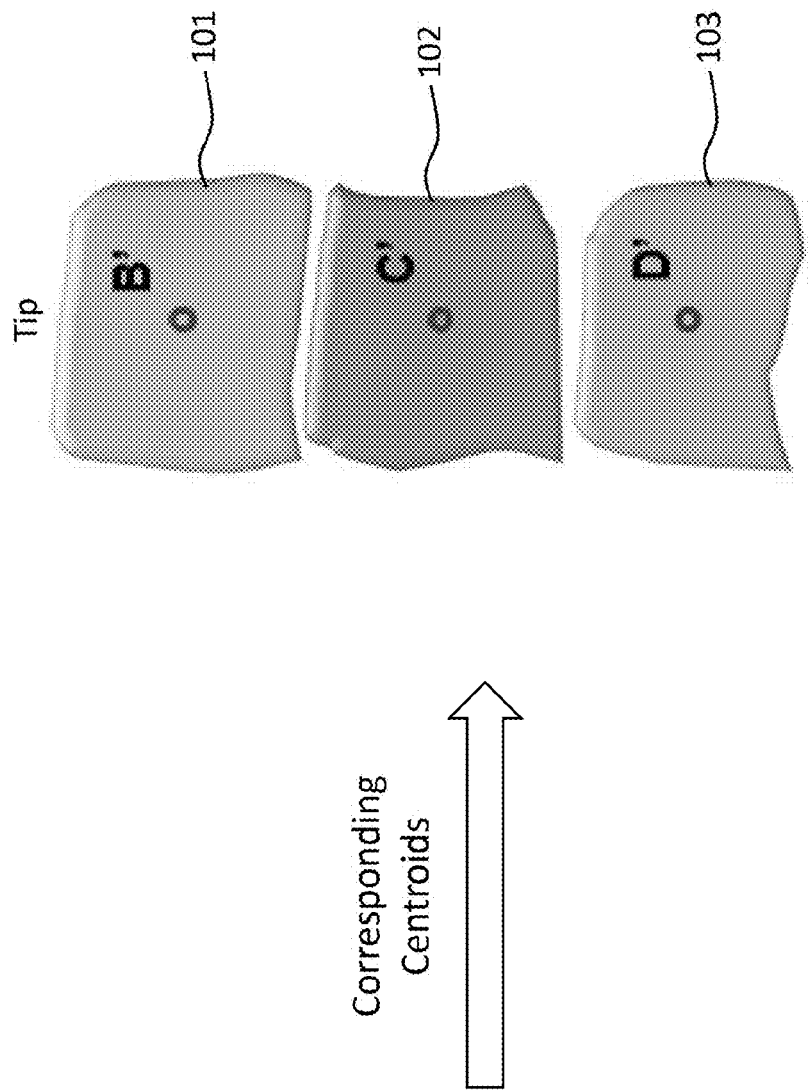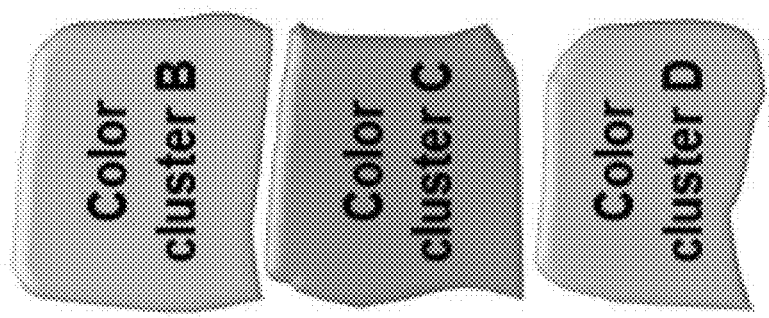
FIG. 13

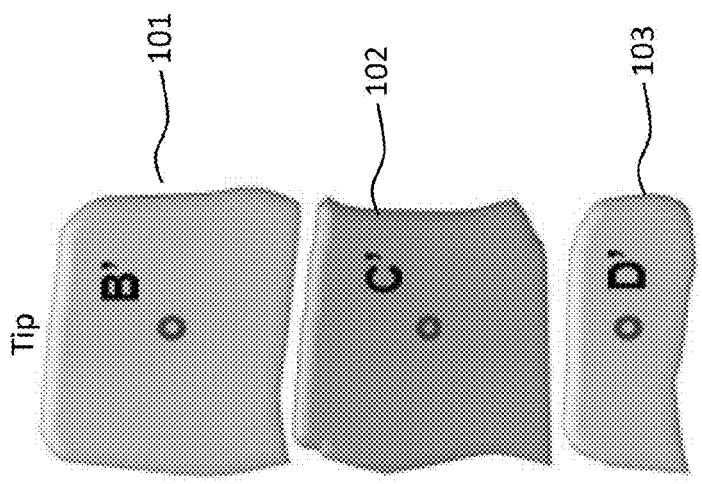
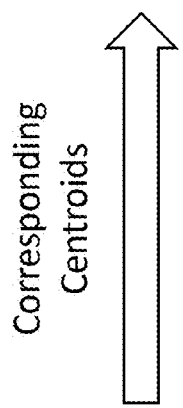
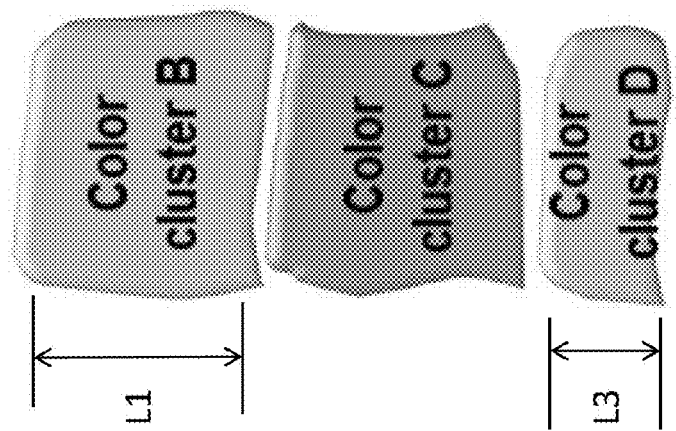
FIG. 14

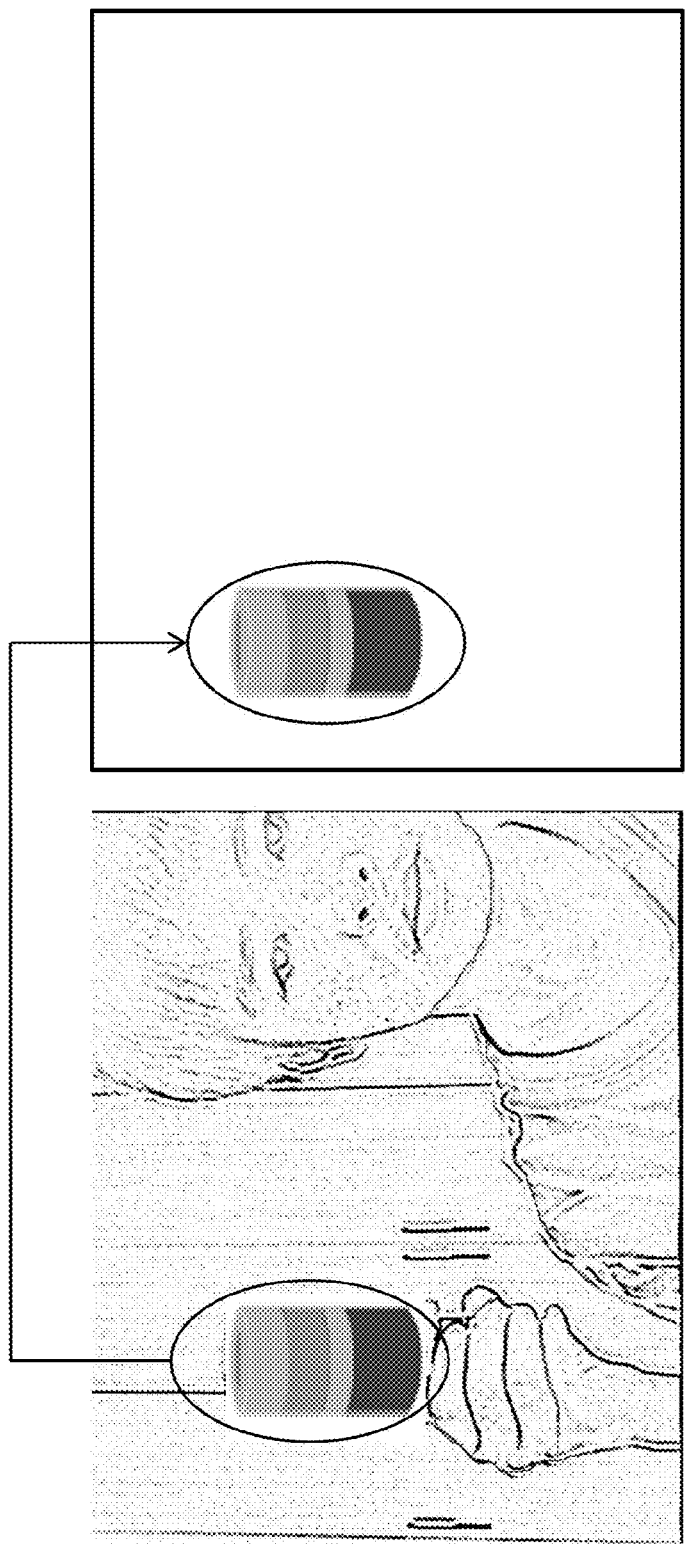

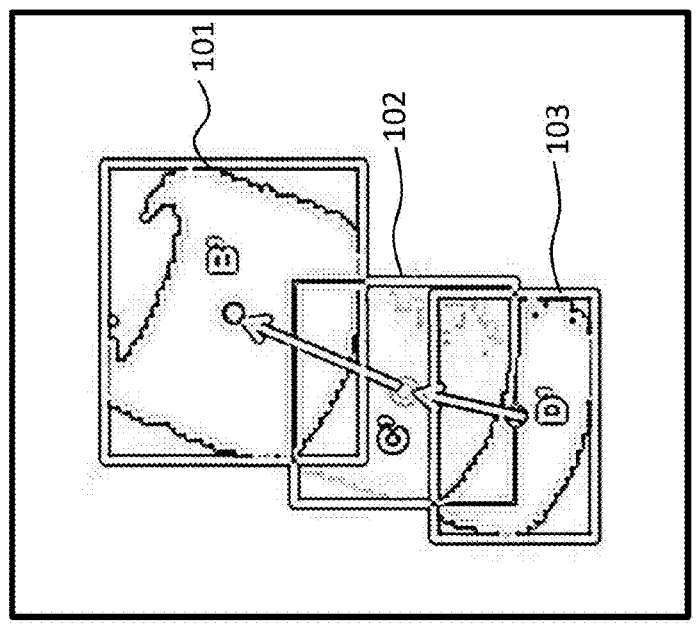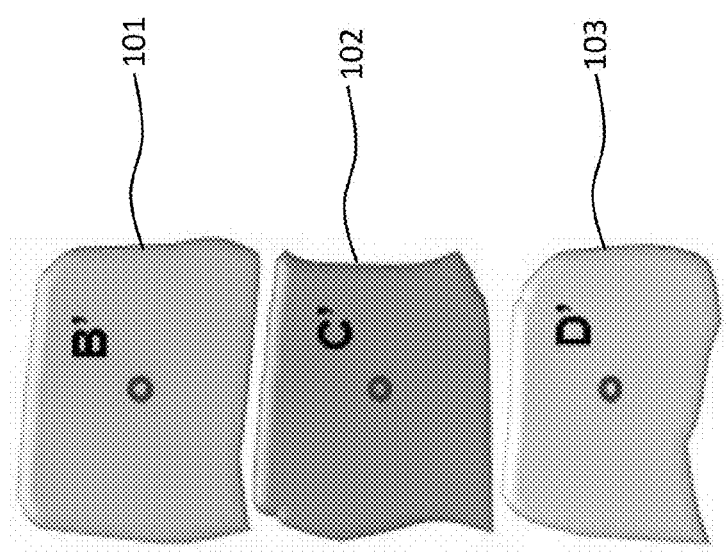
FIG. 21

IMAGE-BASED OBJECT TRACKING SYSTEM IN 3D SPACE USING CONTROLLER HAVING MULTIPLE COLOR CLUSTERS

CROSS-REFERENCE TO RELATED APPLICATION

This application is a non-provisional application claiming priority of U.S. provisional application No. 61/751,241, filed on Jan. 10, 2013. This application is also a continuation-in-part application claiming priority of U.S. non-provisional application Ser. No. 13/962,949, filed on Aug. 8, 2013, which is currently pending and also claiming priority of U.S. provisional application 61/681,629, filed on Aug. 10, 2012. The entirety of the above-mentioned patent applications are hereby incorporated by reference herein and made a part of this specification.

BACKGROUND OF THE INVENTION

1. Field of the Invention

The present invention generally relates to a controller utilizing an image-based object tracking method to perform real-time tracking of movements and rotations of the controller. More particularly, the present invention relates to one or more controller each having multiple color clusters, and an image-based object tracking method in 3D space using the one or more controllers having multiple color clusters.

2. Description of the Related Art

A growing trend in the electronic gaming industry is to develop games and controllers that increase the real-time 3D spatial interaction between a game player and an electronic gaming system. One method of accomplishing a richer real-time interactive experience is to use game controllers whose movement and motion are tracked by the electronic gaming system in order to track the game player's movements and use these movements as control or command inputs for game play. Traditional method of object tracking used on tracking the movement and motion of the game controllers are achieved via embedded motion sensors and may have a singular distinguishable color detecting region disposed on the game controller. However, the singular colored color detecting region of the game controller fails to provide multi-color segmentation functionality, and is thereby subjected to color blending problem when encountering color interference from the image background. Furthermore, the game controller is visually tracked only by the singular distinguishable color detecting region without correct determination on geometry, shape and the pointing direction of the game controller itself. Appearance of the tracked game controller in the captured image may be varied or distorted, or even to the point of being completely disappeared during certain movements thereof, especially while being held toward the camera for performing object tracking.

Meanwhile, other disadvantages of conventional motion controller and image-based object tracking system in 3D space include for example, having complex device architecture, reliability issues, and excessive costs. Therefore, there is room for improvement in the art.

SUMMARY OF THE INVENTION

According to one aspect of an embodiment of the present invention, one or more controllers each having multiple color clusters located on a side surface and multiple color clusters of concentric circular areas located at a top surface thereof designed to avoid occlusion effect is provided for generating motions, gestures, movement, and/or rotations in 3D space.

According to one aspect of an embodiment of the present invention, an object tracking method using the one or more controllers each having multiple color clusters is provided to perform real-time tracking of movements, gestures, zoom in/out and rotating, and virtual mouse functions of the controllers.

According to one aspect of the present invention, the present invention provides an image-based object tracking system which includes a controller, the controller comprising two or more color clusters, an input button, one or more motion sensor, and a wireless transmission unit; a processing unit, the processing unit comprising a camera, an object tracking algorithm, and a wireless transmission unit; and a display, the display comprising a monitor screen, in which the camera is configured to capture real-time images of the controller, the processing unit is connected to the display to provide real-time display of processed image contents from the captured images of the controller on the monitor screen, the controller is configured to be directly interacting with the displayed processed image content on the monitor screen. In the object tracking system, the wireless transmission unit of the controller is configured to provide wireless transmission with the wireless transmission unit of the processing unit.

According to one aspect of the present invention, the present invention provides one embodiment of the controller having three color clusters located on a side surface thereof and two color clusters having concentric circular areas located at a top surface thereof; the three color clusters are respectively arranged in order next to one another, and the color of the first color cluster is the same as the color of the third color cluster Another embodiment of the controller has two color clusters located on a side surface thereof and two color clusters having concentric circular areas located at a top surface thereof; In the above controller embodiments, the colors for the color clusters can be green and blue, the colors for the color clusters can be all different and distinct, the colors for the color clusters can be configured in an alternating manner, a tip is defined at the top surface portion of the controller, each of the two top clusters disposed at the top surface portion of the controller has a concentric circular shape of a different radius and color, and in an alternative embodiment, a plurality of motion sensors configured in the controller, so that the controller is thereby equipped to provide detection of rotational movements around yaw, pitch, and roll directions.

According to one aspect of the present invention, the present invention provides dual cameras configured in the image-based object tracking system to calculate the depth information of the tracked controller and the spatial translation of the controller along x, y and z axes of entire 3D space According to one aspect of the present invention, the present invention provides an object tracking method without scale calibration which includes the following steps: performing color learning on a controller using a learning box superimposed on a displayed image and a color learning algorithm; wherein prior to color learning on the controller, the exposure or white balance of the camera is controlled to maintain stability of the background of the captured image when the illumination in the image environment changes; upon determining that the color learning of the controller is not successful, determining if color relearning of the controller is required; upon determining that the color learning is successful, storing the color learning results of the controller; upon determining that color relearning of the controller is deemed not required, showing a learning error message; upon determining that color relearning of the controller is deemed to be required, repeating from the beginning step of the object tracking method; upon determining that the color learning is successful, starting object tracking of the controller using the color learning results of the controller; capturing images of the controller by using the camera; separating and splitting the controller and the background by color differences using the stored color features from the color learning results; providing color labeling and color filtering to the controller and the background from the captured images; performing an object pairing procedure on the controller, wherein the object pairing is capable of pairing together the tip and the body portion (the body portion is defined as the remaining part of the controller which is not the tip) of the controller; upon determining that the object pairing of the controller is successful, performing output of the object features of the controller including the tip and the body portion thereof for later usage.

According to one aspect of the present invention, the present invention provides an object tracking method with scale calibration comprising the steps of: performing color learning on a controller using a learning box superimposed on a displayed image and a color learning algorithm; wherein prior to color learning on the controller, the exposure or white balance of the camera is controlled to maintain stability of the background of the captured image when the illumination in the image environment changes; upon determining that the color learning of the controller is not successful, determining if color relearning of the controller is required; upon determining that the color learning is successful, storing the color learning results of the controller; upon determining that color relearning of the controller is deemed not required, showing a learning error message; upon determining that color relearning of the controller is deemed to be required, repeating from the beginning of the object tracking method; upon determining that the color learning is successful, starting object tracking of the controller using the color learning results of the controller; capturing images of the controller by using the camera; separating and splitting the controller and the background by using differentiation criteria of color differences, in which the stored color features from the learning results are used; providing color labeling and color filtering to the controller and the background from the captured images; performing an object pairing algorithm on the controller, in which the object pairing is capable of pairing together the tip and the body portion (the body portion is defined as the remaining part of the controller which is not the tip) of the controller; upon determining that the object pairing of the controller is successful, performing output of the object features of the controller including the tip and the body portion thereof for later usage, and performing scale calibration.

According to one aspect of the present invention, the present invention provides an object tracking method without scale calibration using more than one controller. First, one of the controllers is undergoing color learning; determining if the color learning of each of the controllers is successful or not, namely from $1^{st}$ controller, $2^{nd}$ controller, until the Nth controller, where N is the total number of controllers; upon determining that the color learning of any of the controllers is deemed not successful, determining if color relearning of that controller is required. upon determining that the color learning of each of the controllers, from the $1^{st}$ controller to the Nth controller is deemed to be successful, then stop; upon determining that color relearning of the controller is not required, showing a learning error message and stop; upon determining that the color relearning of the controller is required, return to the beginning step of the object tracking method; storing the color learning results of the controllers from the $1^{st}$ controller to the Nth controller; upon successful color learning of the controllers, starting object tracking of each of the controllers using the color learning results of the controllers; capturing images of each of the controllers by using the camera; separating and splitting the controllers and the background by color differences using the stored color features from the color learning results; providing color labeling and color filtering to the controllers and the background from the captured images; performing an object pairing procedure on the controllers; upon determining that the object pairing of the controllers is successful, performing output of the object features of the controllers for later usage.

According to one aspect of the present invention, the present invention provides the height differences of the color clusters facilitate the determining of the location of the tip of the controller According to one aspect of the present invention, the present invention provides a pairing procedure of the color clusters for the object tracking method comprising the steps of: starting an object pairing procedure of the tip and the body part of the controller; searching for all of the identified color clusters in a captured image; pairing together the color clusters by checking for geometry features and correlations; upon determining the pairing of the color cluster is not successful, capturing images of the controller by using the camera; upon determining that the pairing of the color clusters is successful, and upon determining that there is more than one pair of the color clusters is to be paired together, labelling the paired objects by learning order sequence, output the features of the objects for later usage; upon determining that there is not more than one pair of the color clusters, outputting the object features for later usage. A plurality of circumscribed rectangles are constructed with respect to the color clusters for surrounding and enclosing the outer edges and boundaries of the respective color clusters, and half of the diagonal distances of each of the respective circumscribed rectangles for the color clusters are designated by C1 and C2 and are governed by the following equations for determining whether the centroid of a first color cluster is inside a second color cluster:

$$C1 = \beta * C2, \text{ where } 0.5 < \beta < 1 \qquad [1]$$

Centroid of a first color cluster$=A'=(Ax,Ay)$,

Centroid of a second color cluster$=B'=(Bx,By)$ then $\sqrt{(Ax-Bx)^2+(Ay-By)^2}<C2$ which means B' is inside the first color cluster.
Meanwhile, the color clusters are paired together by checking for geometry features and correlations by satisfying the following criteria: a summation total of the number of pixels that are substantially the same color as the stored color features from the color learning results for each of the suspected color clusters are obtained; the summation total of the pixels for the suspected color clusters are tabulated and compared.

According to one aspect of the present invention, the present invention provides a successful pairing of the color clusters achieved based on the condition that the distance between the centroids of the compared suspected color clusters is less than the summation of the heights thereof and that the summation total of the pixels of one suspected color cluster is approximately equal to the summation total of the pixels of another suspected color cluster used in the comparison. Meanwhile, a failed attempt in cluster pairing having a background color camouflage region is based on the condition that the distance between the centroids of the compared suspected color clusters is larger than the summation of the heights thereof, and that the summation total of the pixels of one suspected color cluster is much less than the summation total of the pixels of another suspected color cluster used in the comparison. Upon completion of the pairing procedure of the color clusters, the two (proper) color clusters are paired together, meanwhile, the background color camouflage region is then rejected. Upon successful pairing of the color clusters, the controller is thereby correctly recognized and identified according to the respective color cluster pairs and can be later tracked under the object tracking method.

According to one aspect of the present invention, the present invention provides a scale calibration procedure for use without dual cameras in the object tracking method comprising steps of: starting scale calibration procedure; locating the position of extremity portion of the controller in the captured image; performing scaling calculation based on the extremity position data; performing a position mapping, in which the original position of the extremity portion of the controller is compared with the mapping position thereof after scale calibration is performed.

According to one aspect of the present invention, the present invention provides a scale calibration procedure for use with dual cameras in performing the scale calibration step in the object tracking method comprising steps of: starting a scale calibration procedure; locating the position of extremity portion of the controller in the captured image; performing scaling calculation based on the extremity position data and a depth information obtained from the dual cameras; performing a position mapping, in which the original position of the extremity portion of the controller is compared with the mapping position thereof after scale calibration is performed.

According to one aspect of the present invention, the present invention provides that a successful pairing of the pair of adjacent color clusters is achieved based on the condition that the summation total of the pixels of one color cluster is approximately equal to the summation total of the pixels of the other color cluster used in the comparison, upon successful pairing of the two pairs of adjacent color clusters, the position of the tip of the controller is thereby verified. Other conditions for successful pairing of the color clusters includes: (a) the distance between the centroids of adjacent color clusters are substantially equal; (b) summation of the distances between the centroids of adjacent color clusters are substantially equal to the distance between the centroids between the farthest locating color clusters.

According to one aspect of the present invention, the present invention provides that cluster pairing is performed based on the following equations $$\overline{C'D'} \approx \overline{B'C'}$$

$$\overline{B'C'} + \overline{C'D'} \approx \overline{B'D'}$$

$$\theta = \cos^{-1}\left(\frac{\overrightarrow{C'B'} \cdot \overrightarrow{D'C'}}{|\overrightarrow{C'B'}| \cdot |\overrightarrow{D'C'}|}\right) < \pm 10°$$

According to one aspect of the present invention, the present invention provides that whenever one of the color clusters disappeared by blending with background color due to the occlusion effect, the controller tip remains to be properly positioned and determined. Other advantages of the embodiments of present disclosure includes the following: providing ease and reliability of determining tip position of the controller regardless of background noise interference and occlusion effect; having a controller that can be very inexpensive to fabricate; the controller can be aesthetically pleasing and can contain many different colors; background (color) noise interference would normally not detrimentally affect the reliability of the controller itself due to having a variety of effective color cluster pairing procedures and steps; and the number of color clusters are not limited to just two or three, but can be four, five, or more; scale calibration can be used to improve the extremity portion of the controller by adjusting thereof to a new mapping position after scale calibration is performed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 shows additional features for distinguishing between two alternative examples or variations of the controller of the first embodiment (having the three color clusters located on the side surface thereof and the two color clusters of concentric circular areas at the top surface thereof).

FIG. 13 shows locations of a plurality of corresponding centroids for the three color clusters located on a side surface of the controller of the first embodiment.

FIG. 14 shows some designated heights of the three color clusters of the first embodiment.

FIG. 19 shows how the controller and the background are separated or split by using differentiation criteria of color differences and the stored color features from the learning results.

FIG. 21 shows a split and filtered image of a controller having three color clusters undergone cluster pairing and tip location determination according to the embodiment of present invention.

DESCRIPTION OF THE EMBODIMENTS

Figure 1:
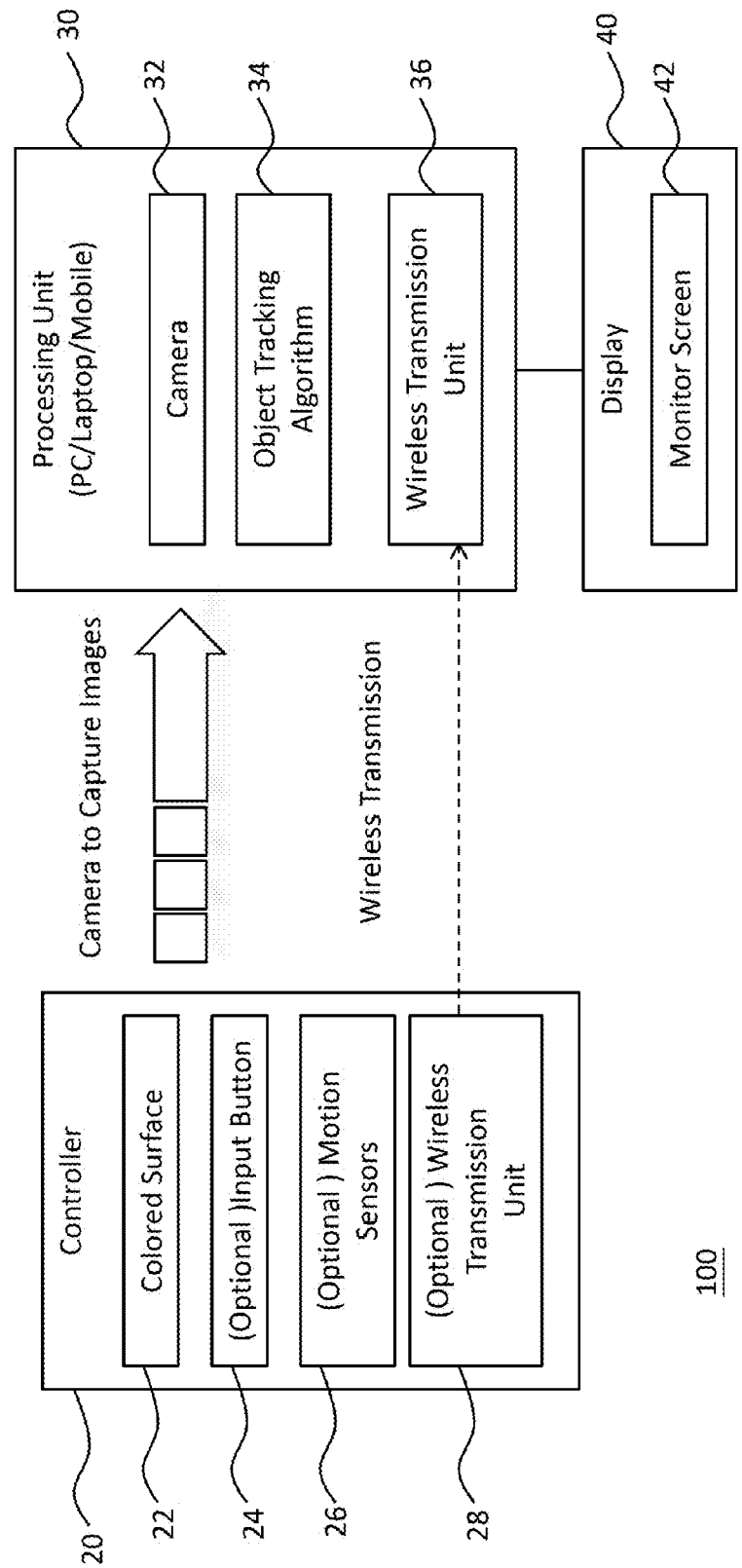
FIG. 1 shows a block diagram of overall system architecture of an image-based object tracking system according to a first embodiment of present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1a, an overall system architecture of an image-based object tracking system 100 according to a first embodiment of present invention is shown in a block diagram, in which the image-based object tracking system 100 includes a controller 20, a processing unit 30, and a display 40. The controller 20 includes a colored surface 22, an input button 24 (which is optional), one or more motion sensor 26 (which is optional), and a wireless transmission unit 28 (which is optional). The processing unit 30 includes a camera 32, an object tracking algorithm 34, and a wireless transmission unit 36. The display 40 has a monitor screen 42, which is a screen for displaying images. The camera 32 is configured to capture real-time images of the controller 20. The wireless transmission unit 28 of the controller 20 can be configured to provide wireless transmission with the wireless transmission unit 36 of the processing unit 30. The processing unit 30 is connected to the display 40 to provide real-time display of processed image contents from the captured images of the controller 20 on the monitor screen 42. Based upon the overall system architecture of the first embodiment, the controller 20 is configured to be directly interacting with the displayed processed image content on the monitor screen 42.

Figure 2:
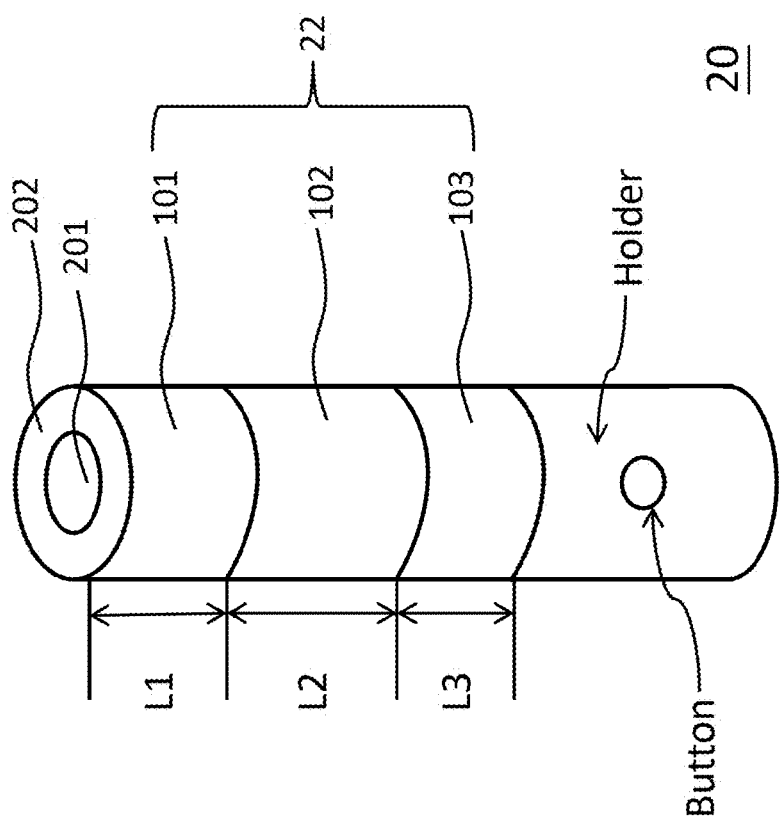
FIG. 2 shows a perspective view of a controller having three color clusters located on a side surface thereof and two color clusters of concentric circular areas at a top surface thereof according to the first embodiment of present invention.

In FIG. 2, the controller 20 of the first embodiment has three side color clusters 101, 102, 103 located on a side surface thereof and two top color clusters 201, 202 having concentric circular areas located at a top surface thereof. In this embodiment, the colored surface 22 include the three side color clusters 101, 102, 103 and the two top color clusters 201, 202. The controller 20 is a cylindrical object which is segmented by the three side color clusters 101, 102, 103 which are respectively arranged in order next to one another. Appearance of the controller 20 is composed of at least two colors and the at least two colors are painted or stained in an alternating manner, i.e. one green cluster next to one blue cluster, which is next to an another green cluster. In addition, besides of the two or more colored surface 22, the controller 20 also includes the following optional items or components, such as, the input button, 24, the one or more motion sensor 26, and the wireless transmission unit 28.

A colored surface 22 is formed by the three side color clusters 101, 102, 103. The color cluster 101 has a height designated as L1, the color cluster 102 has a height designated as L2, and the color cluster 103 has a height designated as L3 in the illustrated embodiment in FIG. 2. The controller 20 is divided up into two portions, namely, the colored surface 22 and a holder 27. The input button 24 is disposed in the holder 27.

Figure 3:
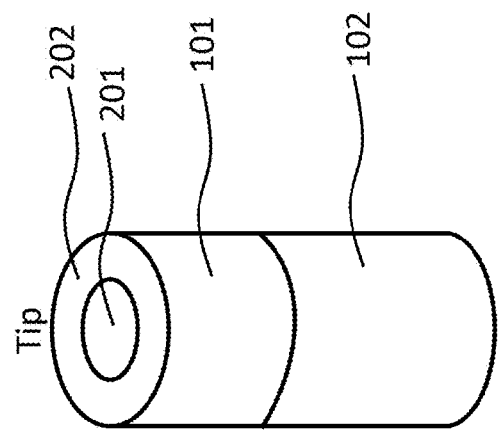
FIG. 3 shows a controller having two color clusters located on a side surface thereof and two color clusters of concentric circular areas at a top surface thereof according to a second embodiment of present invention.

In FIG. 3, a controller 50 having two side color clusters 101, 102 located on a side surface thereof and two top color clusters 201, 202 having concentric circular areas located at a top surface thereof is shown according to a second embodiment of present invention. A tip 52 is defined at the top surface portion of the controller 50. In the second embodiment, a colored surface 57 is formed by the two side color clusters 101, 102.

In FIG. 4, two alternative examples of the controller 20 of the first embodiment are shown, in which alternative example A has a different and distinct color for each of the side color clusters 101, 102, 103, respectively, whereas alternative example B has the same color for the side color clusters 101 and 103 located on the side surface of the controller 20. In other words, the colors for the side color clusters 101, 102, 103 for this embodiment are configured in an alternating manner.

Figure 5:
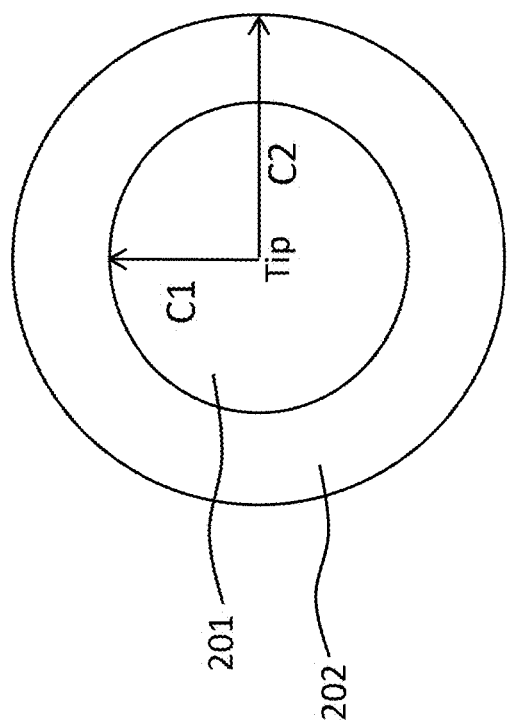
FIG. 5 shows design features configured to allow for recognizing the top portion of the controller in the form of two color clusters having concentric circular shape of different radii and color according to the embodiments of present invention during object tracking in the top view.

In FIG. 5 in the top view, the top surface portion of the controller 20 includes two top color clusters 201, 202 each having a concentric circular shape of a different radius and color according to the embodiments of present invention. The tip 52 is located in the center region of the color cluster 201. The radius of the top color cluster 201 is designated as C1, and the radius of the top color cluster 202 is designated as C2, in which C1 is less than C2.

Figure 6:
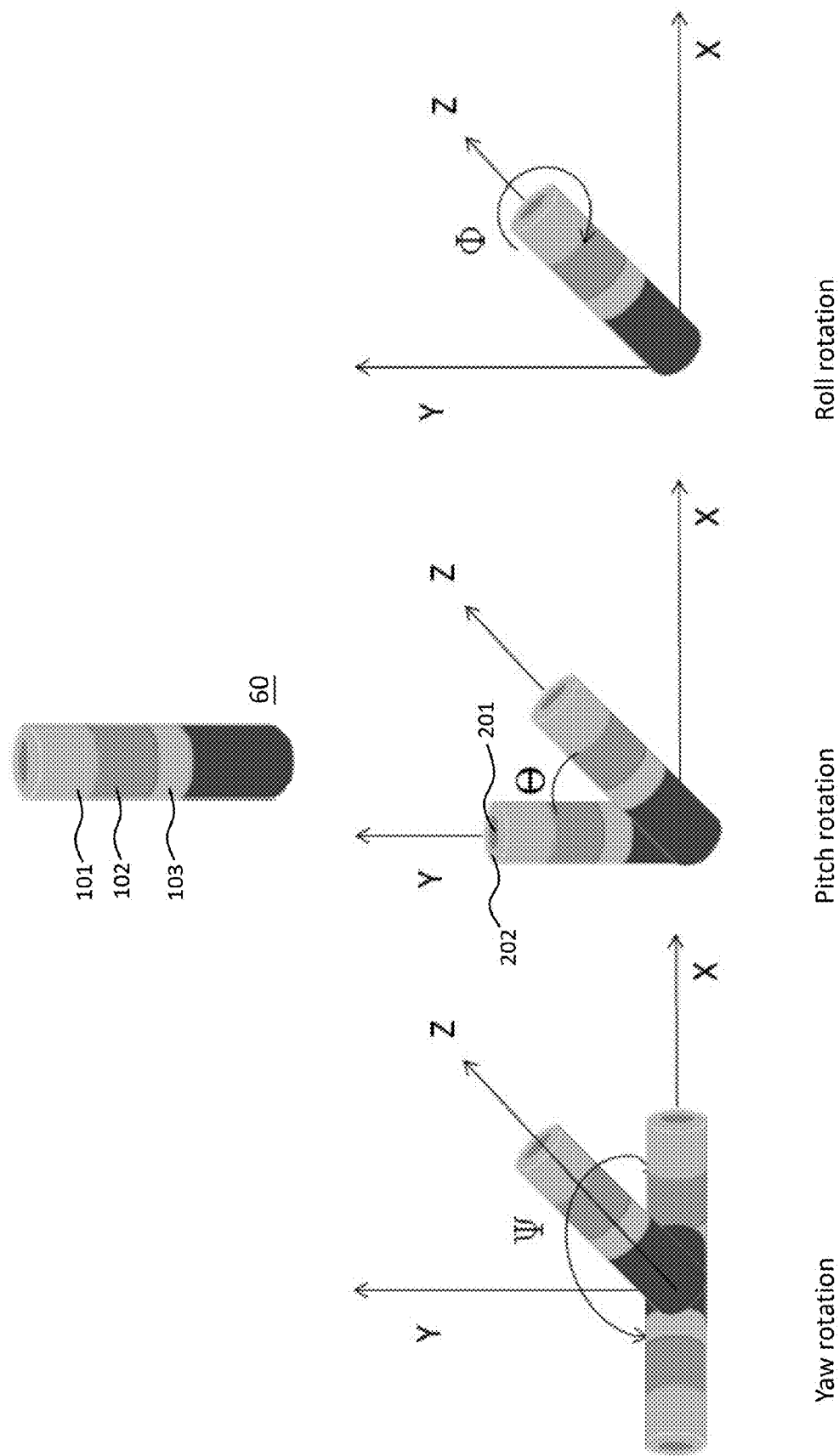
FIG. 6 shows a controller having three color clusters located on a side surface thereof and two color clusters of concentric circular areas at a top surface thereof and a plurality of motion sensors configured therein according to a third embodiment of present invention.
Figure 7:
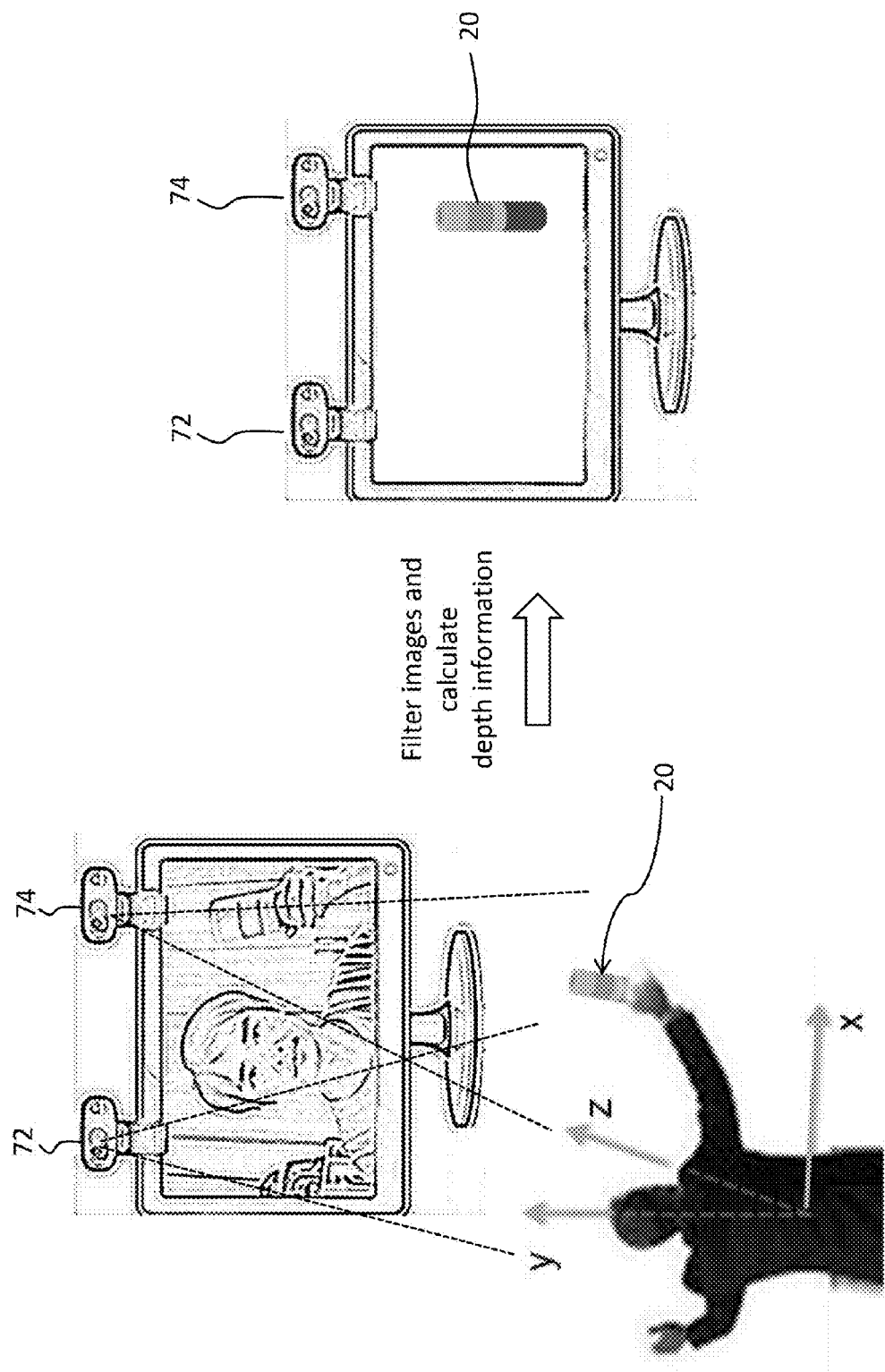
FIG. 7 shows dual cameras being used as part of the image-based object tracking system according to a fourth embodiment of present invention configured to calculate the depth information of the tracked object and the spatial translation of the object along x, y and z axes of entire 3D space.

In FIG. 6, a controller 60 according to a third embodiment of present invention has three side color clusters 101, 102, 103 located on a side surface thereof and two top color clusters 201, 202 of concentric circular areas at a top surface thereof, and also has a plurality of motion sensors 62 configured therein. By having the motion sensors 62, the controller 60 is equipped to provide detection of rotational movements around yaw, pitch, and roll directions. In FIG. 7, dual cameras 72, 74 are configured in an image-based object tracking system 200 according to a fourth embodiment of present invention. The dual cameras 72, 74 are configured to calculate the depth information of the tracked controller 20 and the spatial translation of the controller 20 along x, y and z axes of entire 3D space.

Figure 8A:
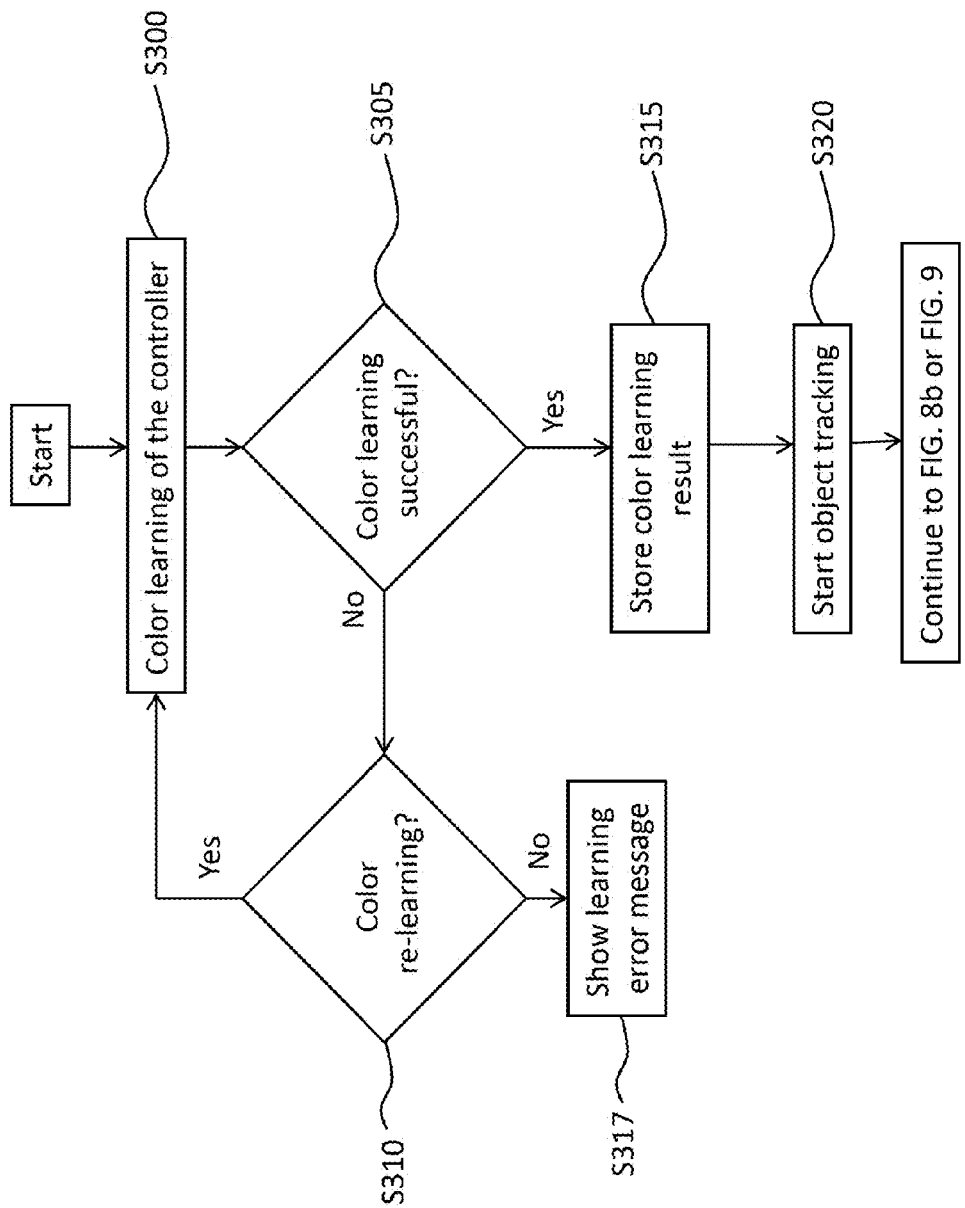
FIGS. 8a and 8b shows a process flow diagram of an object tracking method according to an embodiment without scale calibration using one controller of the embodiments of the present invention.
Figure 8B:
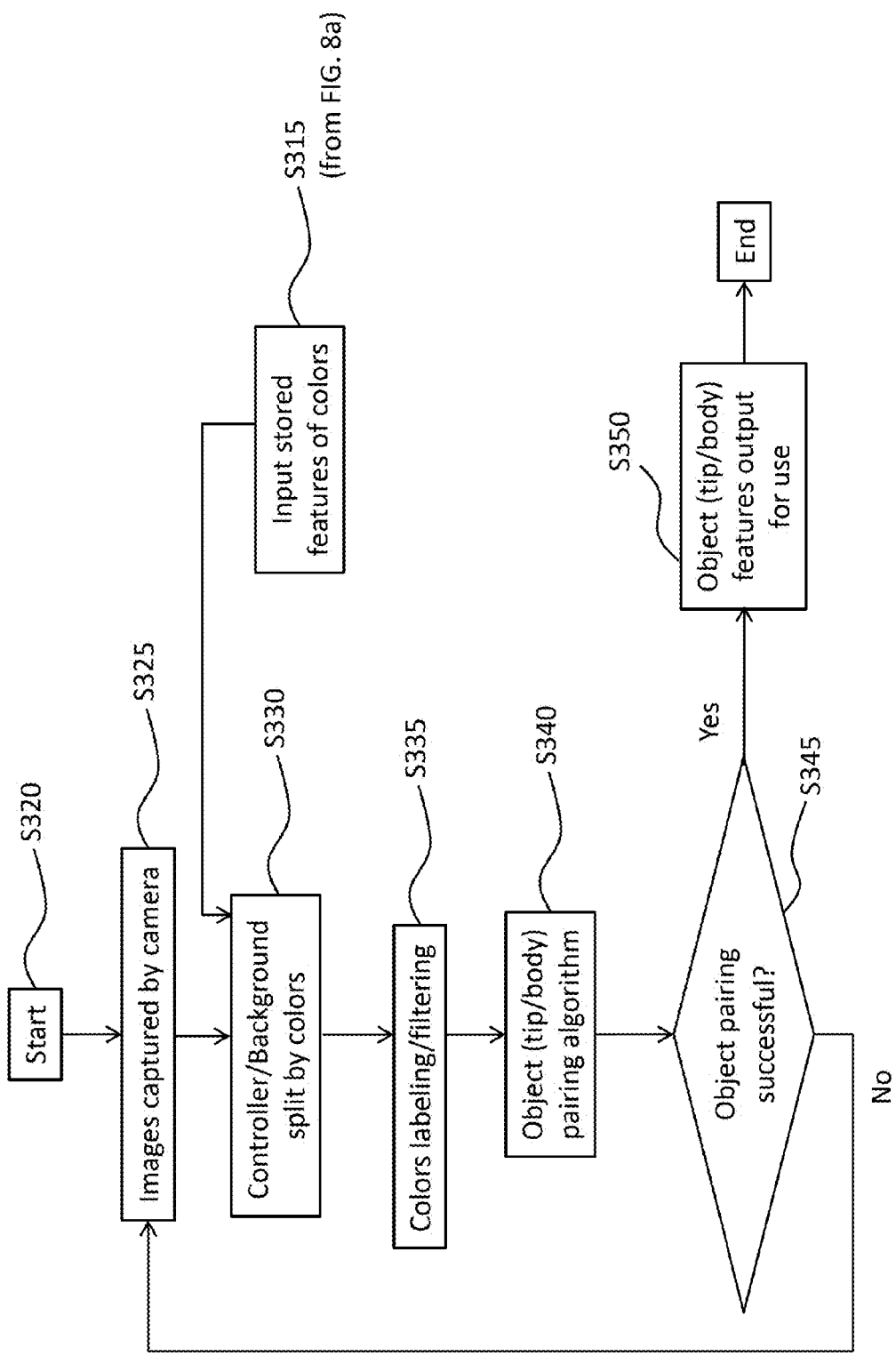
Figure 20:
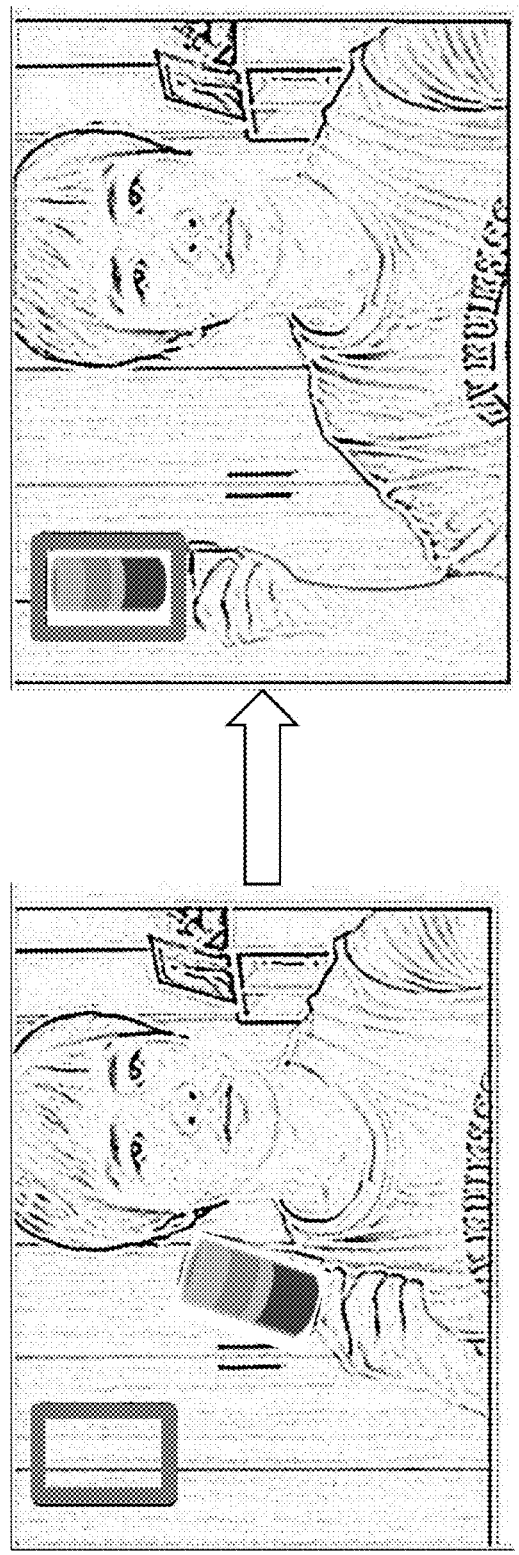
FIG. 20 shows a learning box being used to perform a color learning step according to the embodiments of present disclosure.

An object tracking method without scale calibration according to an embodiment of present disclosure is shown in a process flow diagram in FIGS. 8a-8b. The object tracking method of this embodiment uses any one of the controller of the embodiments of the present invention. The object tracking method includes the following steps: In step S300, the controller undergoes color learning. Color learning of the object involves the storing of the current color features of the controller to a database. During color learning as shown in FIG. 20, a learning box 66 is exhibited and superimposed on the displayed image required for the user to maneuver the controller 20 to fill and occupy substantially all (or as much as possible) of the colored surface 57 of the controller 20 inside the learning box 66. After a period of operating a color learning algorithm, the database will store the color features of the controller. Meanwhile prior to color learning on the controller, the image-based object tracking system 100 can control the exposure or white balance of the camera 32 to make the background of the captured image will not change thereby maintaining stability when the illumination in the image environment changes. For example, the white balance or exposure values can be locked before the color learning takes place. In step S305, determining if the color learning of the controller is successful or not, and if the color learning is deemed not successful, go to step S310 to determining if color relearning of the controller is required, and if the color learning is deemed to be successful, go to step S315. In step S310, if color relearning of the controller is deemed not required, go to step S317 and show a learning error message and stop, and on the other hand if color relearning of the controller is deemed to be required, go back to step S300. In step S315, the color learning results of the controller are stored, and go to step S320. The color features of the controller for the color learning results can be RCB, HSI value, etc. The color features can be calculated and stored in the format of histogram. The stored color learning result can be used for next round of object tracking without re-learning on condition that the operating environment is the same. (i.e. lighting condition). In step S320, object tracking of the controller is started using the color learning results of the controller obtained under step S315. As shown in FIG. 8B, in step S325, images of the controller are captured by the camera. In step S330, the controller and the background are separated or split by using differentiation criteria of color differences as shown in FIG. 19, in which the stored color features from the learning results in step S315 are used. In step S335, color labeling and color filter are provided to the controller and the background from the captured images. In step S340, an object pairing algorithm is performed on the controller, in which the object pairing is capable of pairing together the tip and the body portion (the body portion is defined as the remaining part of the controller which is not the tip) of the controller. In step S345, determining if the object pairing of the controller is successful, and if deemed successful, proceed to step S350, and if deemed not successful, go to Step S325. In step S350, performing output of the object features of the controller including the tip and the body portion thereof for later usage.

Figure 9:
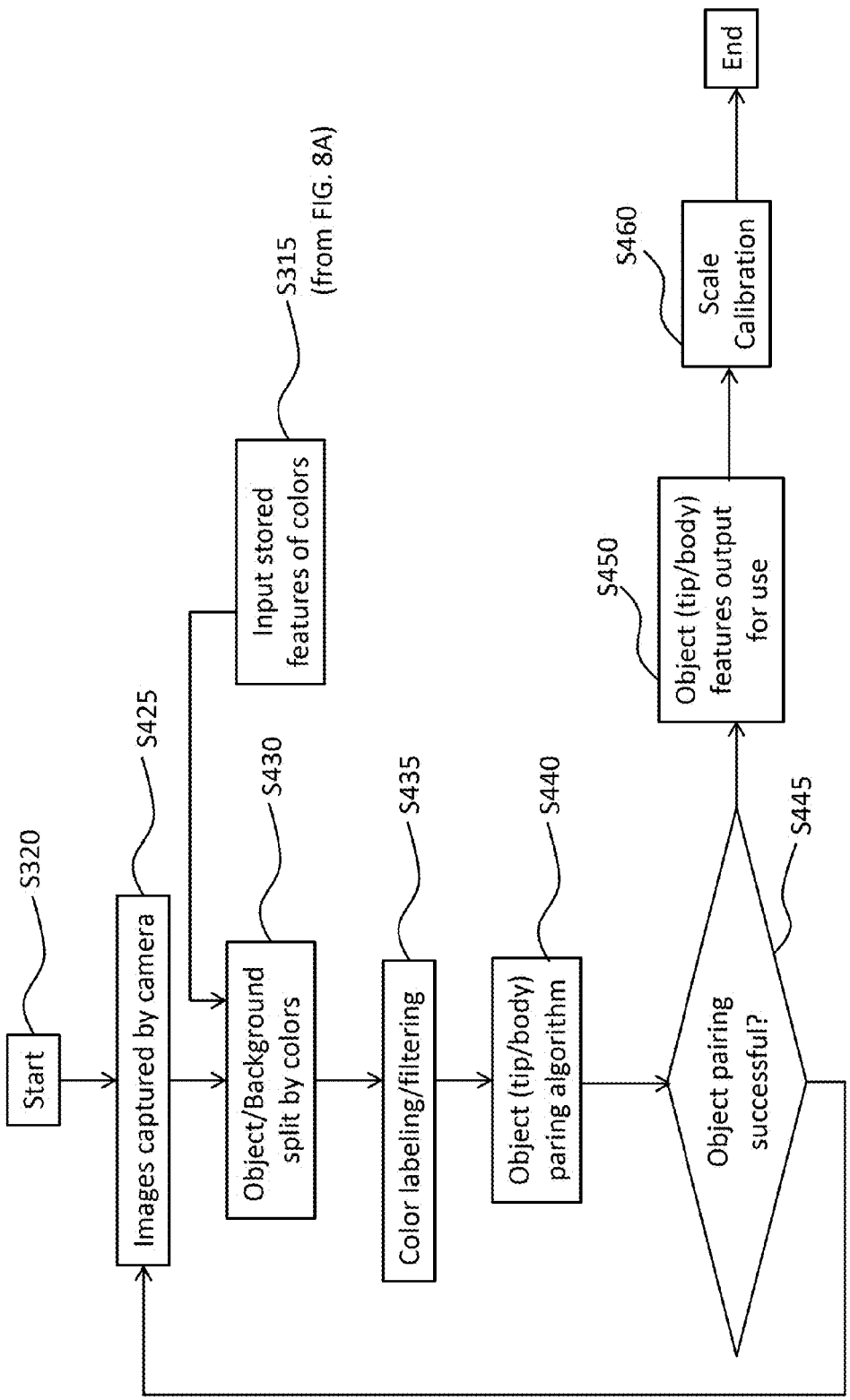
FIG. 9 shows a process flow diagram of an object tracking method according to another embodiment with scale calibration using one controller of the embodiments of the present invention.

An object tracking method with scale calibration according to an another embodiment of present disclosure is shown in a process flow diagram in FIG. 9. The object tracking method of this embodiment uses any one of the controller of the embodiments of the present invention. The object tracking method of this embodiment includes the following steps: Refer back to FIG. 8a, step S300 is first performed due to the fact that this embodiment with scale calibration has the same steps between step S300 to step S320 as those found in FIG. 8a of the embodiment without scale calibration. Then, after the completion of step S320, in step S425 as shown in FIG. 9, images of the controller are captured by the camera. In step S430, the controller and the background are separated or split by using differentiation criteria of color differences, in which the stored color features from the color learning results in step S315 are used. In step S435, color labeling and color filter are provided to the controller and the background from the captured images. In step S440, an object pairing procedure is performed on the controller, in which the object pairing is capable of pairing together the tip and the body portion (the body portion is defined as the remaining part of the controller which is not the tip) of the controller. In step S445, determining if the object pairing of the controller is successful, and if deemed successful, proceed to step S450, and if deemed not successful, go to Step S425. In step S450, performing output of the object features of the controller including the tip and the body portion thereof for later usage. In step S460, performing scale calibration.

Figure 10:
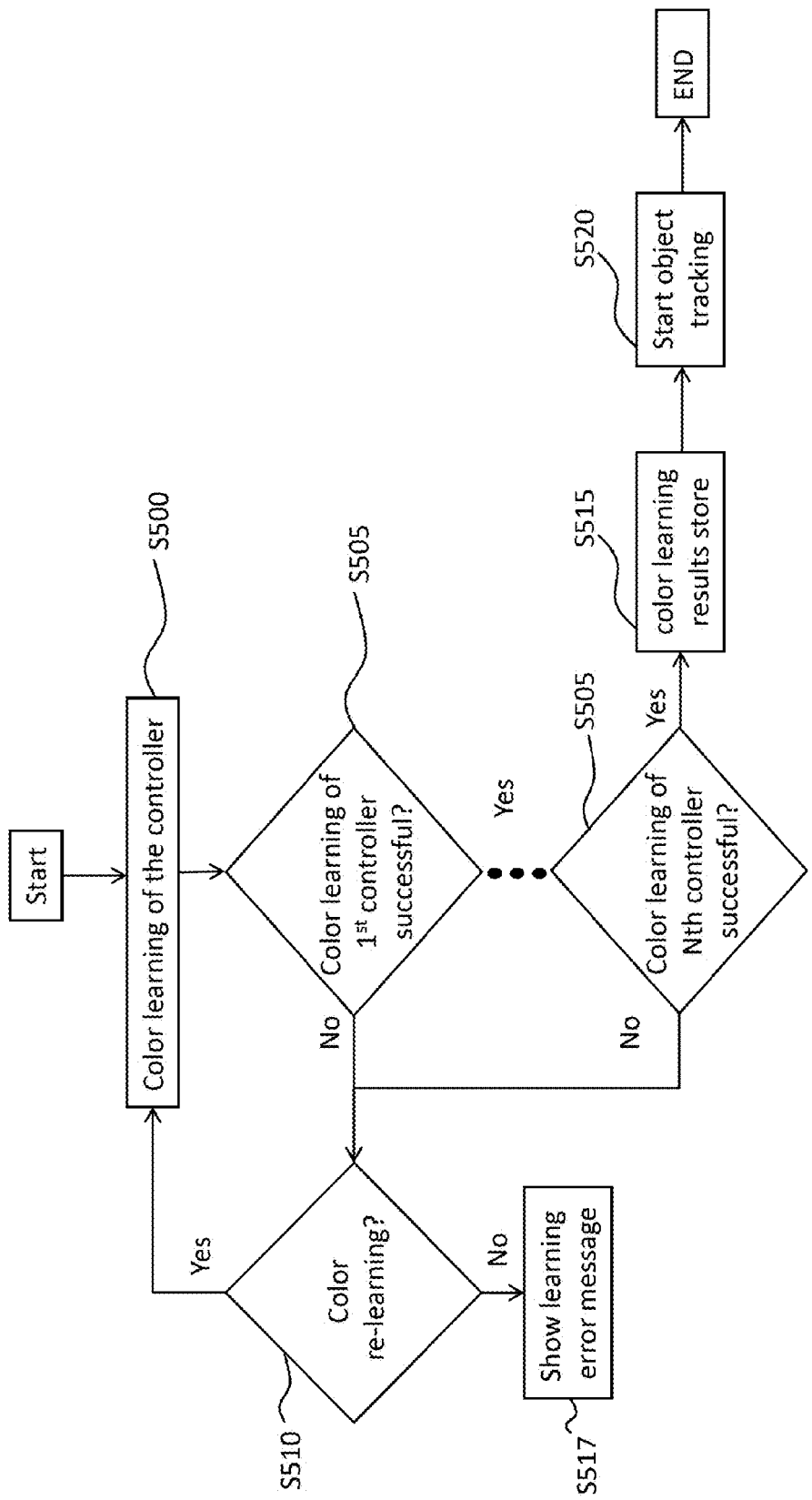
FIG. 10 shows a process flow diagram of an object tracking method according to yet another embodiment using more than one controller of the embodiments of the present invention.

An object tracking method without scale calibration according to yet another embodiment of present disclosure is shown in a process flow diagram in FIG. 10. The object tracking method of this embodiment uses more than one of the controller of the embodiments of the present invention. The object tracking method of the yet another embodiment includes the following steps: In step S500, one controller undergoes color learning. In step S505, determining if the color learning of each of the controllers is successful or not, namely from $1^{st}$ controller, $2^{nd}$ controller, until the Nth controller, where N is the total number of controllers, and if the color learning of any of the controllers is deemed not successful, go to step S510 to determining if color relearning of that controller is required, and if the color learning of each of the controllers, from the $1^{st}$ controller to the Nth controller is deemed to be successful, then terminated from the object tracking method. In step S510, if color relearning of the controller is deemed not required, go to step S517 and show a learning error message and terminate, and on the other hand if color relearning of the controller is deemed to be required, go back to step S500. In step S515, the color learning results of the controllers from the $1^{st}$ controller to the Nth controller are stored, and go to step S520. In step S520, object tracking of each of the controllers is started using the color learning results of the controllers obtained under step S15.

Figure 11:
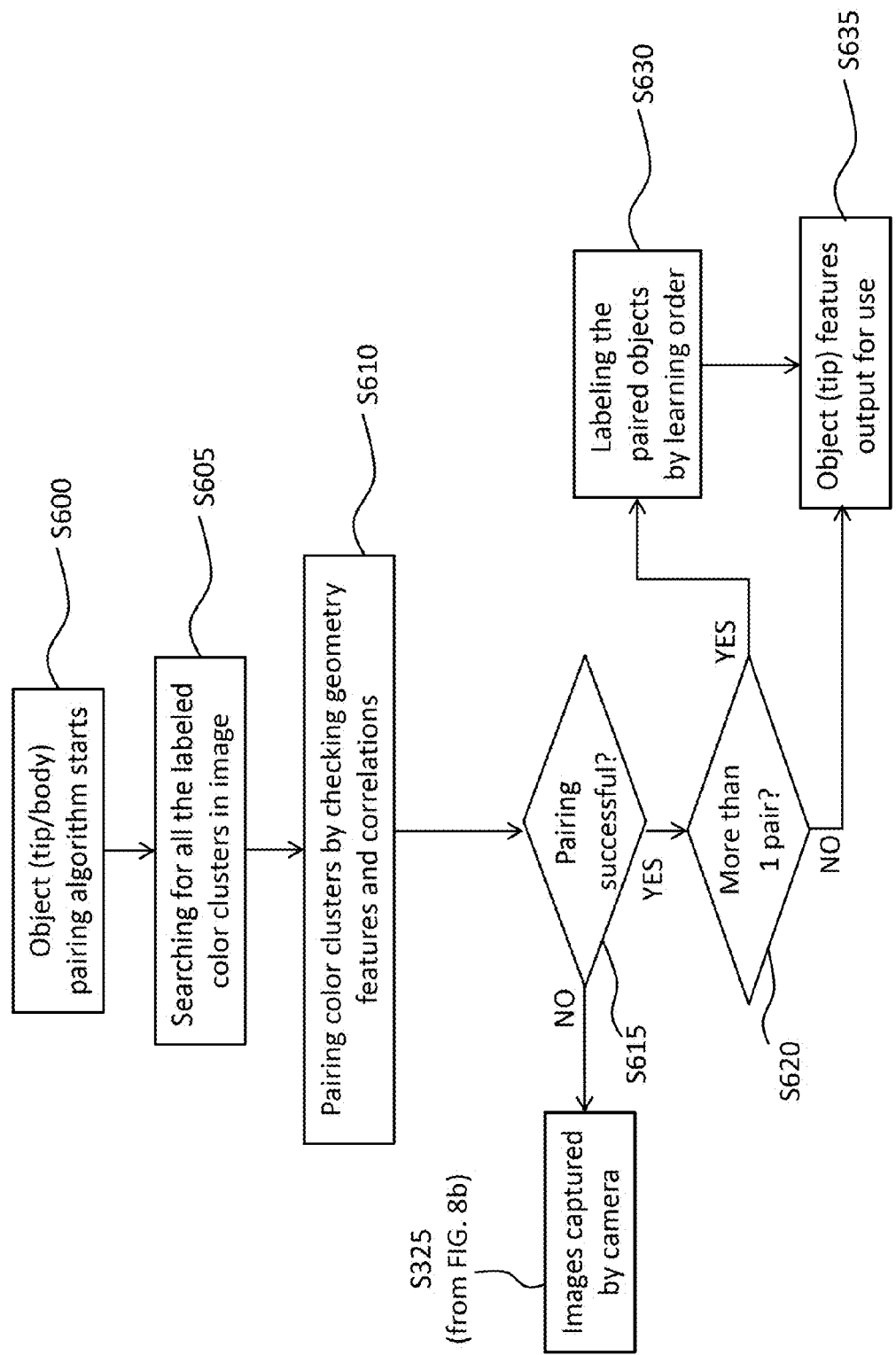
FIG. 11 shows a process flow diagram of a pairing procedure of the color clusters for the object tracking method of the embodiment in FIGS. 8a-8b.

FIG. 11 shows a process flow diagram of a pairing procedure of the color clusters for the object tracking method of the embodiment in FIGS. 8a-8b. In step S600, an object pairing procedure of the tip and the body part of the controller is started. In step S605, all of the identified color clusters in a captured image are being searched for. In step S610, color clusters are paired together by checking for geometry features and correlations. In step S615, determining if the pairing of the color clusters is successful, and if deemed successful, go to step S620, and if deemed not successful, go to step S325 of FIG. 8b to capture images of the controller by using the camera. In step S620, determining if there is more than one pair of the color clusters is to be paired together, and if deemed to be more than one pair, go to step S630, and if deemed to be not more than one pair, then go to step S625 to output the object features for later usage. In step S630, the paired objects are labeled by learning order sequence. In step S635, output the features of the objects for later usage. Upon successful pairing of the color clusters, the controller is thereby correctly recognized and identified according to the respective pairings of color clusters, and can be later tracked in real-time under the object tracking method.

Figure 12:
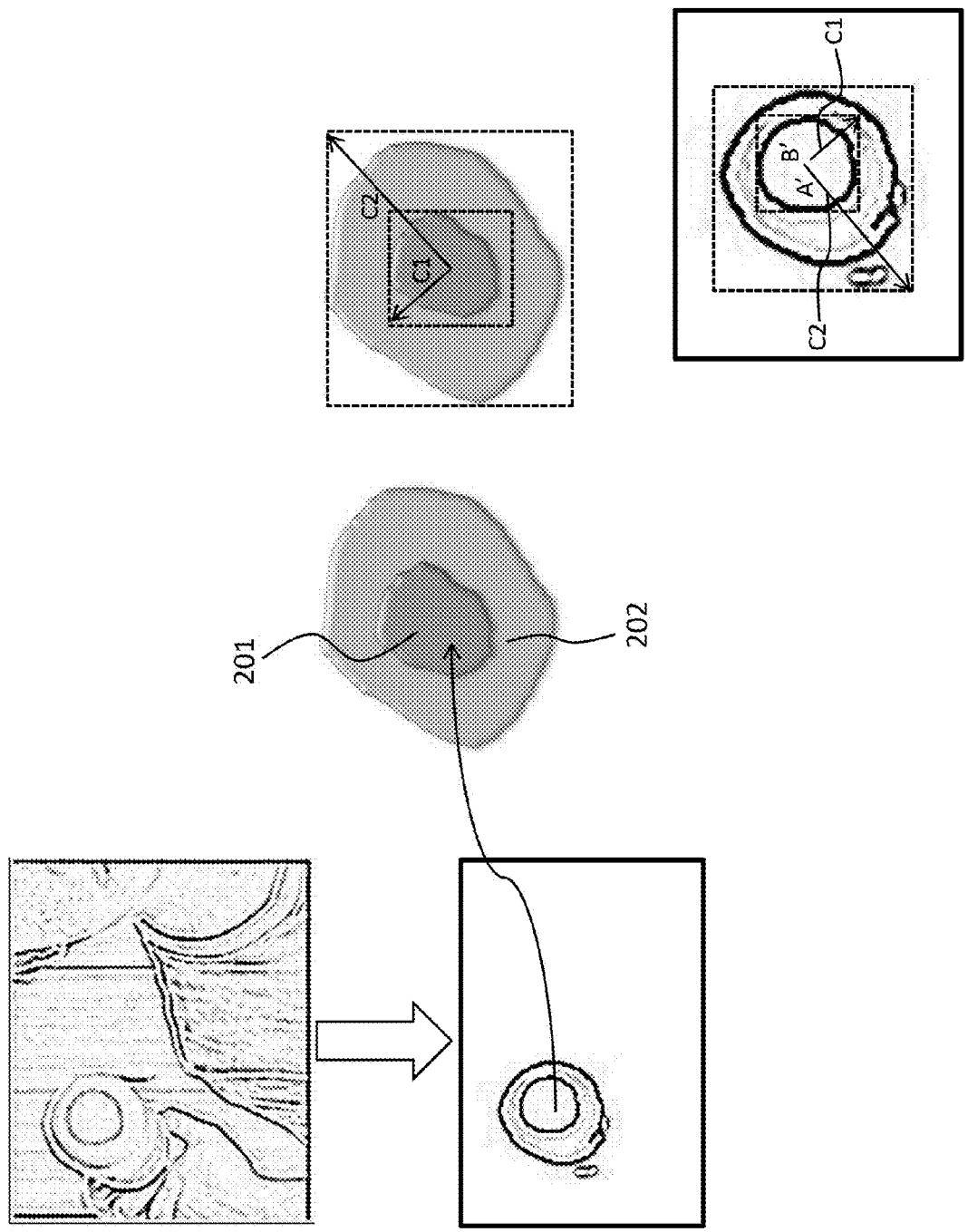
FIG. 12 shows an illustrative example in performing the pairing procedure of FIG. 11 using two color clusters.

In FIG. 12, an illustrative example in performing the pairing procedure of FIG. 11 using two color clusters is shown. In this illustrative example, the controller is held with the tip thereof pointing directly at the camera, and the filtered image shows that two top color clusters 201, 202 are isolated in the captured image. The centroid of the top color cluster 201 is denoted as A' and the centroid of the top color cluster 202 is denoted as B'. In the illustrated example as shown in FIG. 12, a plurality of circumscribed rectangles are constructed with respect to the top color clusters 201, 202 for surrounding and enclosing the outer edges and boundaries of the respective top color clusters 201, 202. Half of the diagonal distances of each of the respective circumscribed rectangles for the top color clusters 201, 202 are designated by C1 and C2 in the illustrated example in FIG. 12. The following equations [1] and [2] are provided for determining whether the centroid of one top color cluster 201 is inside an another top color cluster 202:

$$C1 = \beta * C2, \text{ where } 0.5 < \beta < 1 \qquad [1]$$

Centroid of the top color cluster 201=$A'=(Ax,Ay)$,

Centroid of the top color cluster 202=$B'=(Bx,By)$ $$\text{then } \sqrt{(Ax-Bx)^2+(Ay-By)^2} < C2 \qquad [2]$$

which means that B' is inside the top color cluster 201.

In the above equations [1] and [2], $\beta$ is a coefficient value between 0.5 and 1; A' is defined as the centroid of the top color cluster 201; B' is defined as the centroid of the top color cluster 202; Ax and Ay are the x and y coordinates of the centroid of the top color cluster 201 in an (x, y) coordinate system; Bx and By are the x and y coordinates of the centroid of the top color cluster 202 in the (x, y) coordinate system.

In FIG. 13, the locations of the centroids B', C' and A' for the three side color clusters 101, 102, 103 of the controller of the first embodiment are shown. This embodiment has the side color cluster 103 which is used for reconfirm the respective color cluster pairings. The three color clusters are different in color from one another.

In FIG. 14, designated heights of the side color clusters 101, 103 of the first embodiment are designated by L1 and L3, respectively. In this embodiment, the colors of color cluster 101 and color cluster 103 are the same, therefore the height of the side color cluster 103 (L3) should be different from the height of the side color cluster 101 (L1), and the purpose of such difference in height is to permit the finding of where the tip 52 is located. In other words, the reason that the height of the side color cluster 103 (L3) is being configured to be different from the height of the side color cluster 101 (L1), is so that the tip 52 of the controller 50 can be correctly or properly located at the corresponding top surface portion of the controller 50.

Figure 15:
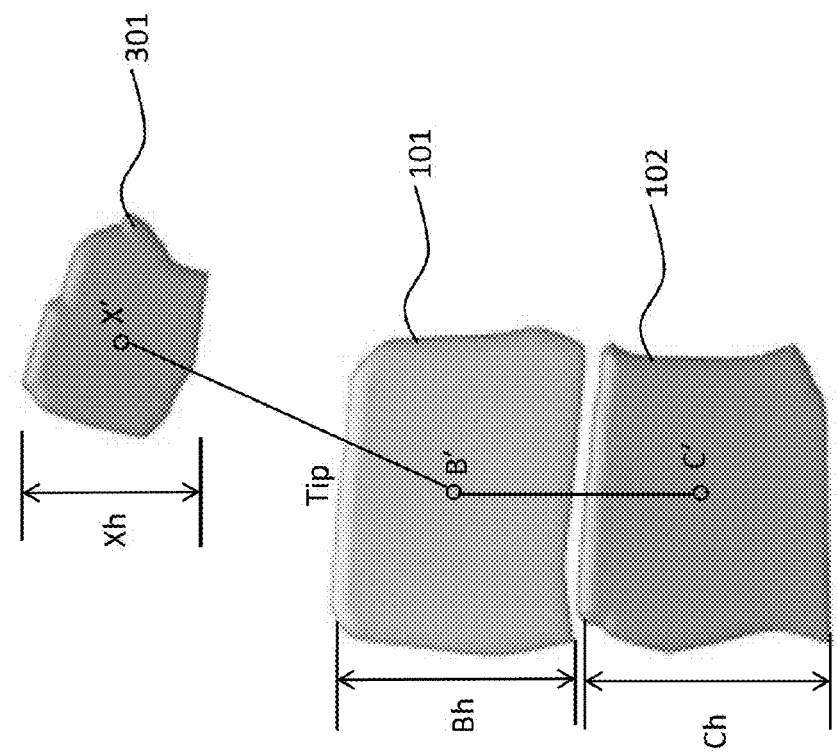
FIG. 15 shows an illustrative example of a successful pair in performing the pairing procedure of FIG. 11 using two color clusters at close proximity to a background color camouflage region mimicking as one of the color clusters.

Referring to FIG. 15, an illustrative example of a successful pair in performing the pairing procedure of FIG. 11 using two side color clusters 101, 102 at close proximity to a background color camouflage region 301 mimicking as one of the color clusters is provided. Please note in this illustrative example, at first, the background color camouflage region 301 only appears to be very similar to the color cluster, but has not yet being properly ruled out that the background color camouflage region 301 is indeed not one color cluster prior to performing of the pairing procedure in Step S610 of FIG. 11. In other words, the two side color clusters 101, 102 and the background color camouflage region 301 can be all considered to be suspected color clusters prior to pairing procedure. In the illustrated example, the centroids of the side color clusters 101, 102 are designated as B' and C', respectively, and the centroid of the background color camouflage region 301 is designated as X'. The height of the color cluster 101 is designated as Bh, the height of the side color cluster 102 is designated as Ch, and the height of the background color camouflage region 301 is designated as Xh in FIG. 15. The distance from X' to B' is larger than the combined distance of Xh and Bh. According to the (cluster) pairing procedure in step S610 of FIG. 11, the color clusters are paired together by checking for geometry features and correlations, which includes of the following: a summation total of the number of pixels that are substantially the same color as the stored color features from the color learning results in step S315 of FIGS. 8a and 8b for each of the suspected color clusters are obtained, including such as the background color camouflage region 301, since until this point, it has not been properly determined as to whether the background color camouflage region 301 belongs to a color cluster or not. Later, the summation total of the pixels (pixel count) for the side color clusters 101, 102 and for the background color camouflage region 301 are tabulated and compared. A successful pairing of the color clusters is achieved based on the condition that the distance between the centroids of the compared suspected color clusters is less than the summation of the heights thereof and that the summation total of the pixels of one suspected color cluster is approximately equal to the summation total of the pixels of another suspected color cluster used in the comparison. Meanwhile, a failed attempt in cluster pairing is based on the condition that the distance between the centroids of the compared suspected color clusters is larger than the summation of the heights thereof, and that the summation total of the pixels of one suspected color cluster is much less than the summation total of the pixels of another suspected color cluster used in the comparison. Upon completion, the two side color clusters 101 and 102 are paired together in the illustrated example, whereas, on the other hand, the background color camouflage region 301 has been rejected.

Figure 16:
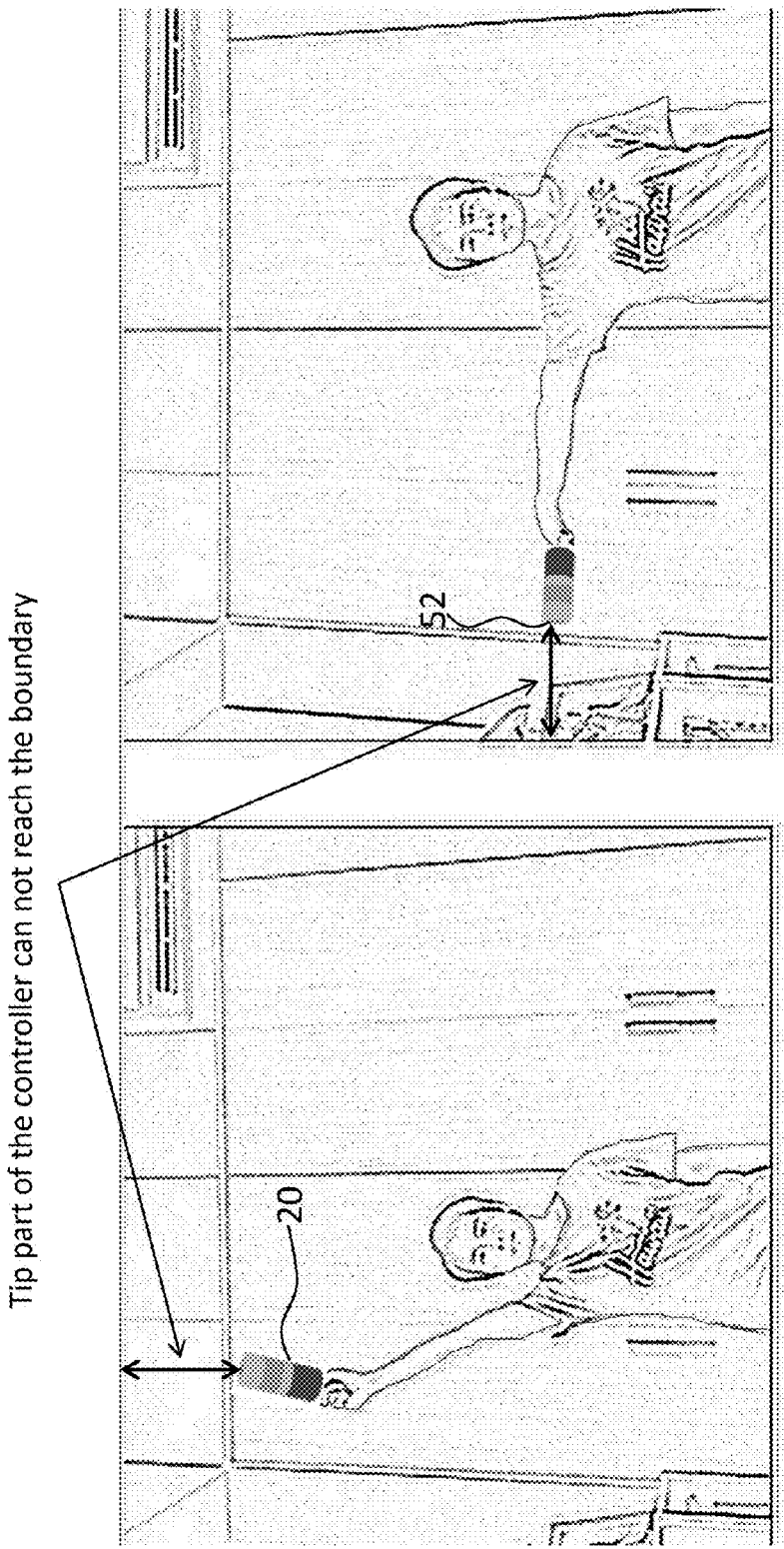
FIG. 16 shows an illustrative example of a situation where scale calibration can be called upon to correct for the issue of having the tracked object being out of bounds to reach the outer peripheral boundaries of the capture image.

The controller 20 in seen in an illustrative example where scale calibration can be called upon to correct for the issue of having the tracked controller 20 (object to be tracked) being out of bounds to reach the outer peripheral boundaries of the capture image as shown in FIG. 16, in which the tip 52 of the controller 20 cannot reach the edges of the captured image.

Figure 17:
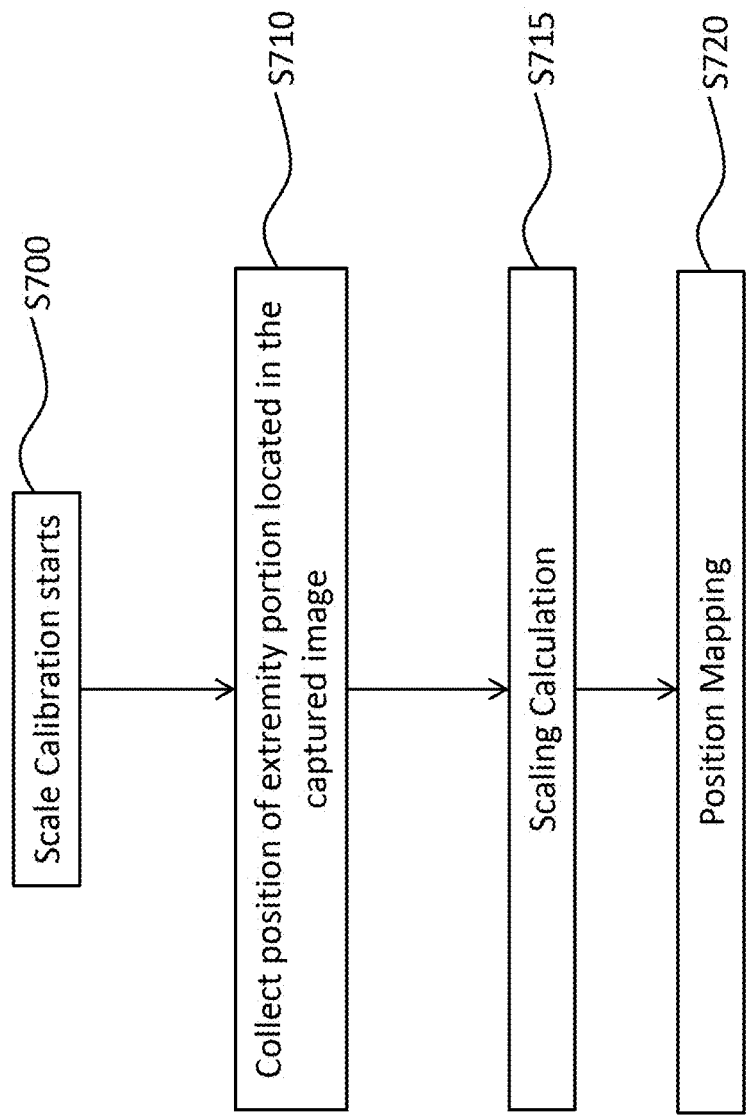
FIG. 17 shows a process flow diagram of a scale calibration procedure for use without dual cameras in the object tracking method according to the another embodiment with scale calibration.

The scale calibration procedure for use without dual cameras in the object tracking method according to the another embodiment, as shown in FIG. 17, includes the following steps: step S700: a scale calibration procedure is started; step S710: the position of extremity portion of the controller in the captured image is located; step S715: scaling calculation is performed based on the extremity position data from step S710; and step S720: a position mapping is performed, in which the original position of the extremity portion of the controller is compared with the mapping position thereof after scale calibration is performed.

Figure 18A:
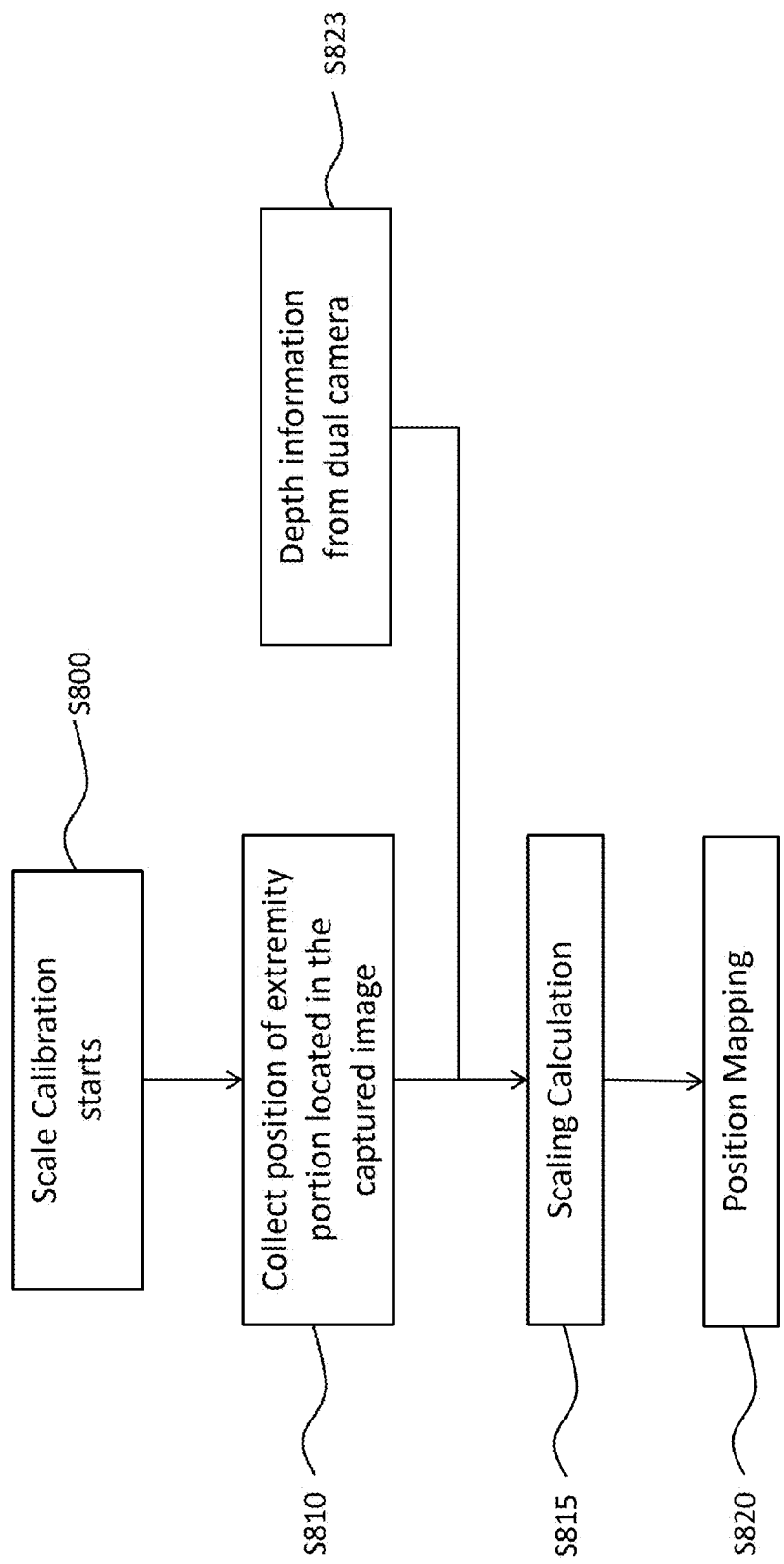
FIG. 18a shows a process flow diagram of a scale calibration procedure for use with dual camera.
Figure 18B:
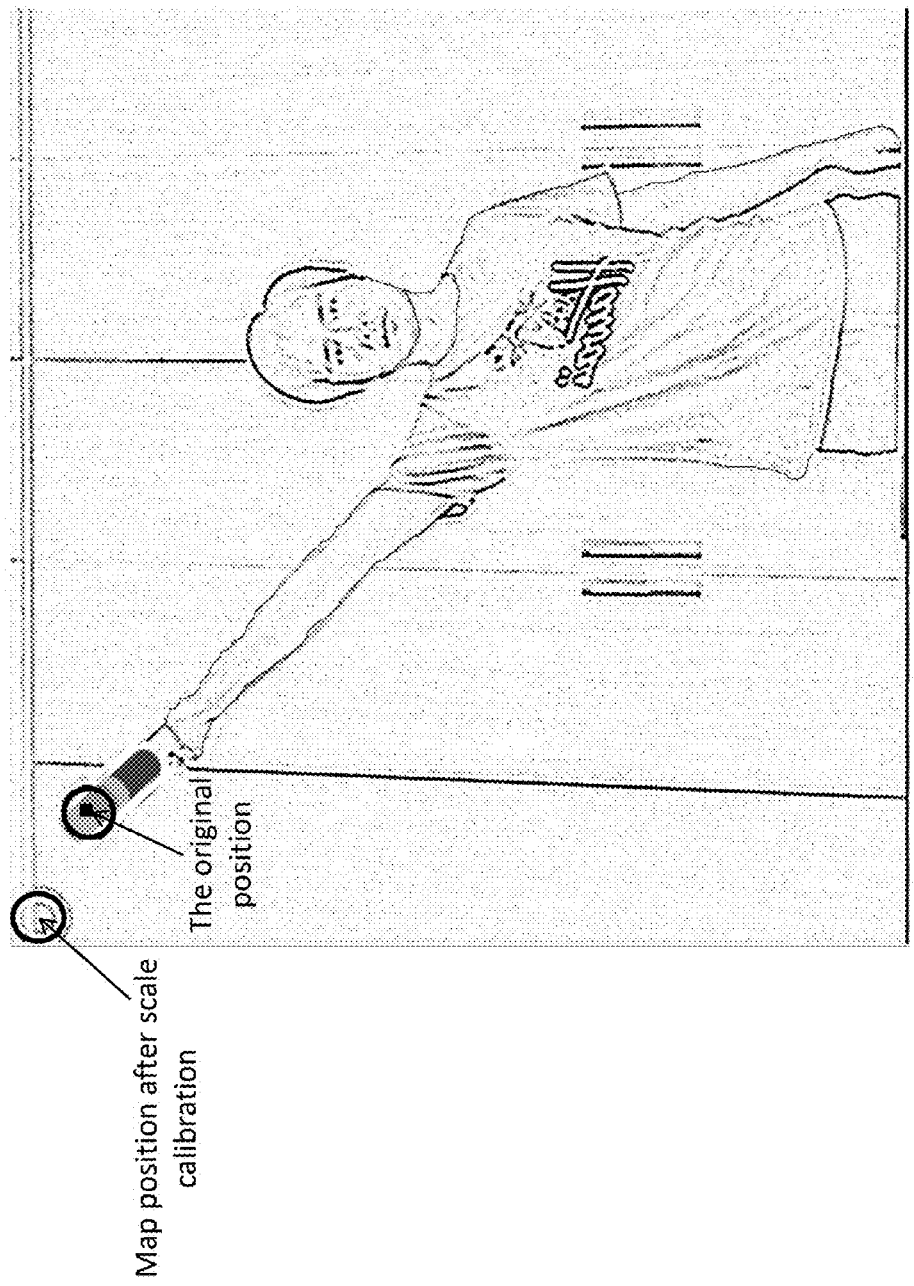
FIG. 18b shows the original position of the extremity portion of the controller compared with the mapping position thereof after scale calibration procedure with dual cameras is performed

A scale calibration procedure for use with dual cameras in performing the scale calibration step in the object tracking method according to a still yet another embodiment, as shown in FIG. 18a, includes the following steps: step S800: a scale calibration procedure is started; step S810: the position of extremity portion of the controller in the captured image is located; step S815: scaling calculation is performed based on the extremity position data from step S810 and a depth information obtained from the dual cameras as provided under step 823; and step S820: a position mapping is performed as shown in FIG. 18b, in which the original position of the extremity portion of the controller is compared with the mapping position thereof after scale calibration is performed.

Referring to FIG. 21, a split and filter image of a controller having three side color clusters 101, 102, 103 which has undergone cluster pairing and tip location determination is shown. A summation total of the number of pixels that are of substantially the same color as the stored color features from the color learning results for each of the side color clusters 101, 102, 103 are obtained. Later, the summation total of the pixels (total pixel count) for the side color clusters 101, 102, 103 are tabulated and compared. For example, the total pixel count for adjacent side color clusters 101, 102 are compared, and the total pixel count for adjacent side color clusters 102, 103 are compared. A successful pairing of the pair of adjacent color clusters is achieved based on the condition that the summation total of the pixels of one color cluster is approximately equal to the summation total of the pixels of the other color cluster used in the comparison. (i.e. 101 compared to 102, and 102 compared to 103). Upon successful pairing of the two pairs of adjacent color clusters, namely, the side color cluster 101 successfully paired with the side color cluster 102, and the side color cluster 102 successfully paired with the side color cluster 103, the position of the tip of the controller is thereby verified. Other conditions for successful pairing of the color clusters include the following: (a) the distance between the centroids of adjacent color clusters are substantially equal; (b) summation of the distances between the centroids of adjacent color clusters are substantially equal to the distance between the centroids between the farthest locating color clusters (which are side color clusters 101 and 103 in the illustrated embodiment in FIG. 21). Cluster pairing can be performed based on satisfying the following equations below, in which B' represents the location of the centroid of the side color cluster 101, C' represents the location of the centroid of the side color cluster 102, and D' represents the location of the centroid of the side color cluster 103. The lines drawn above the respective B', C', and D' designate distances defined therebetween the respective centroids. The angle θ is defined to be as follow in Equation [5]:

$$\overline{C'D'} \approx \overline{B'C'} \quad [3]$$

$$\overline{B'C'} + \overline{C'D'} \approx \overline{B'D'} \quad [4]$$

$$\theta = \cos^{-1}\left(\frac{\overrightarrow{C'B'} \cdot \overrightarrow{D'C'}}{|\overrightarrow{C'B'}| \cdot |\overrightarrow{D'C'}|}\right) < \pm 10° \quad [5]$$

where $\overline{C'D'}$ is the distance between the centroid of the side color cluster 102 and the centroid of the side color cluster 103; $\overline{B'C'}$ is the distance between the centroid of the side color cluster 101 and the centroid of the side color cluster 102; $\overline{B'D'}$ is the distance between the centroid of the side color cluster 101 and the centroid of the side color cluster 103; the arrowed line→above C'B' represent a line vector constructed from the centroid of the side color cluster 102 to the centroid of the side color cluster 101; the arrowed line→above D'C' represent the line vector constructed from the centroid of the side color cluster 103 to the centroid of the side color cluster 102; the angle θ is an enclosed angle formed between the C'B' line vector and the D'C' line vector.

Figure 22:
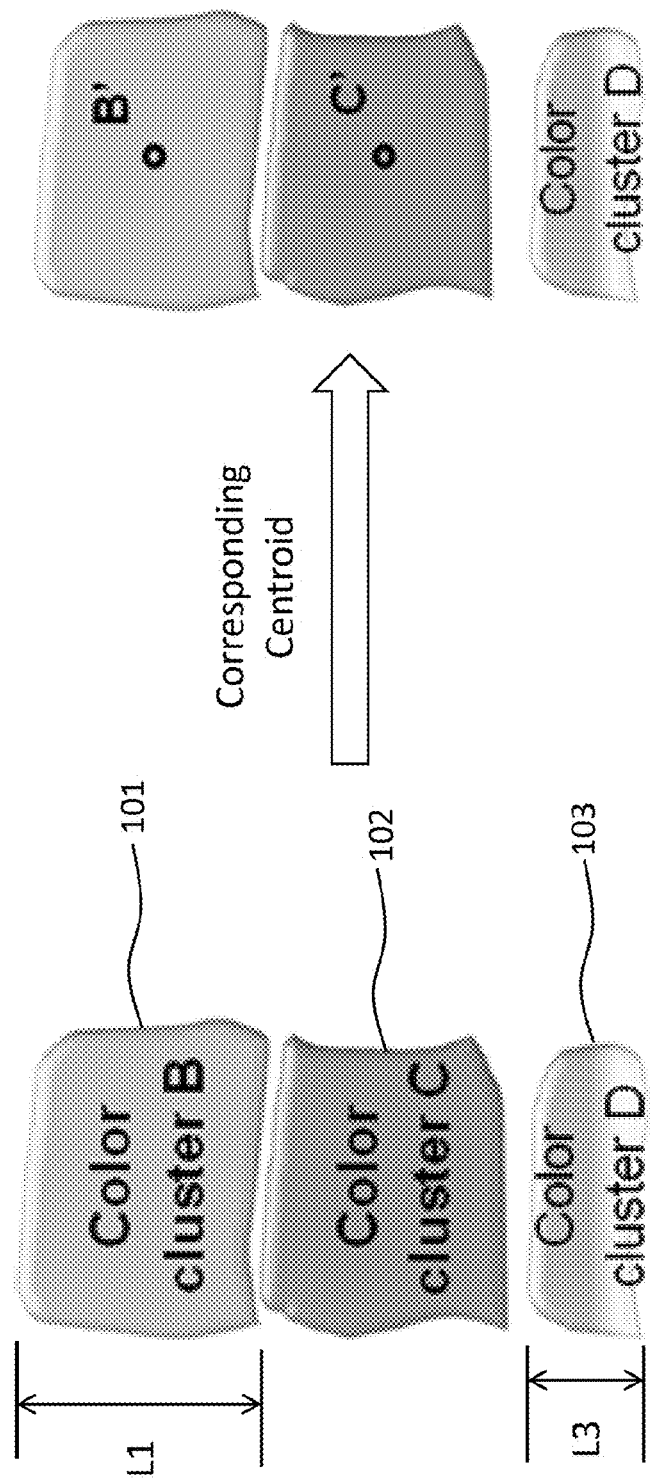
FIG. 22 shows an illustrative example of a controller with one of the color clusters disappeared by blending with background due to the occlusion effect.

Referring to FIG. 22, an illustrative example of a controller having three side color clusters 101, 102, 103 with one of the color clusters disappeared by blending with background color due to the occlusion effect and background noise interference caused by tilting down the controller tip toward the camera, is shown. Due to the disappearance of one of the side color cluster 103 (referring to the bottom thereof being becoming transparent), this then becomes a two-color-cluster (101, 102) controller. Nevertheless, the controller tip can remain to be positioned and determined.

Figure 23:
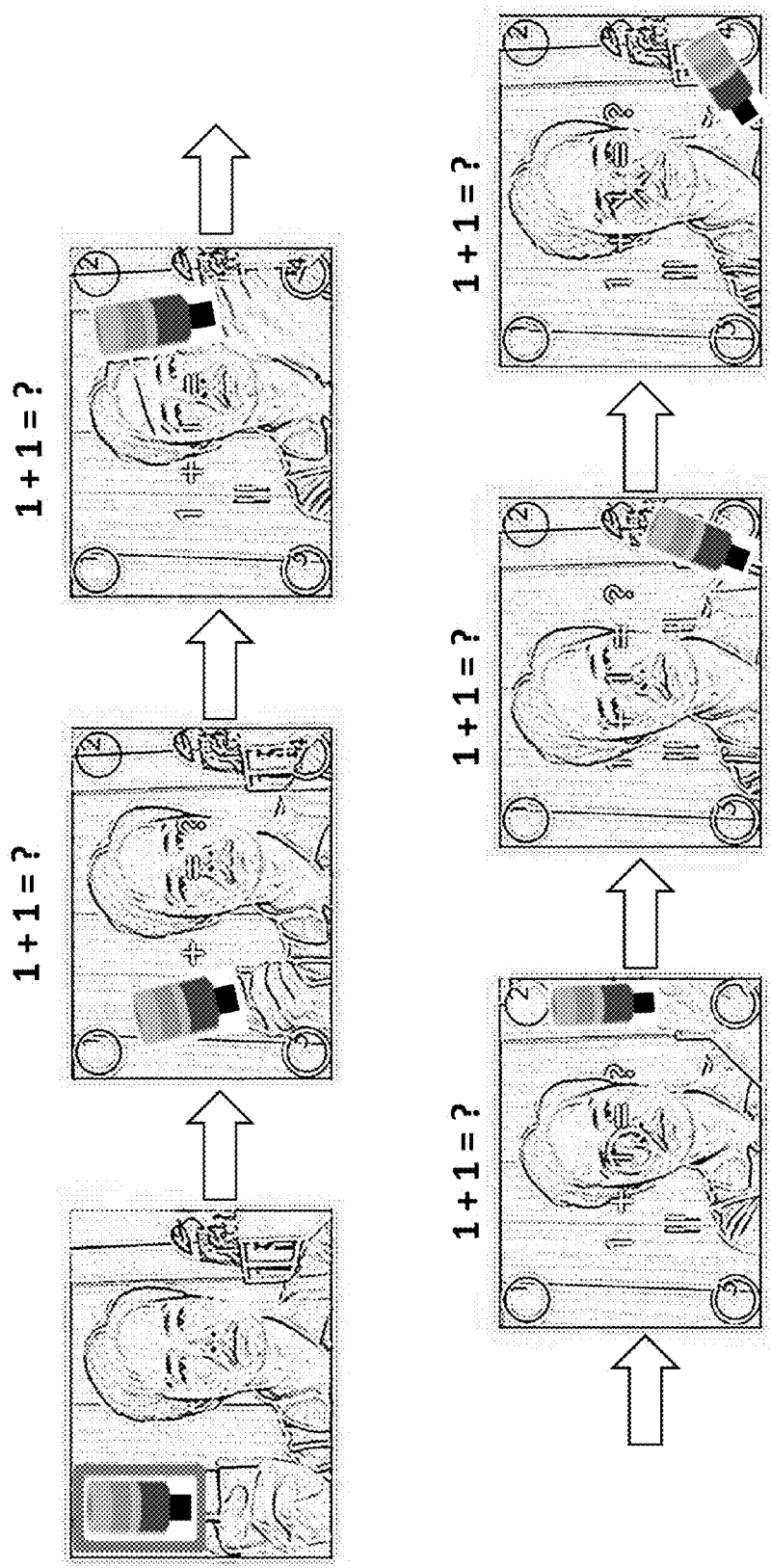
FIG. 23 shows a plurality of screen capture frame images of an illustrative example of an interactive quiz game using the controller utilizing the image based object tracking method of the embodiments of present disclosure for perform real-time movement tracking and activating of on-screen item selection commands.

Refer to FIG. 23, an illustrative example of an interactive quiz game using a controller utilizing the image based object tracking method to perform real-time tracking of movements of the controller and activating on-screen commands using the controller is shown. The controller has three side color clusters 101, 102, 103 located on a side surface and two multiple top color clusters 201, 202 at a top surface thereof. The side color cluster 101 and 103 have the same color. During game play, the controller can be detected to be floating above one of the circles at the four corners of the image screen for activating an answer selection choice in an attempt to answer the quiz game question of "what is 1+1=?". Additional functionalities for the controller include the movement trajectory tracking of the controller, providing interaction of the controller with different portions of the captured image, and activating of on-screen button or item selection commands on the captured image.

It will be apparent to those skilled in the art that various modifications and variations can be made to the structure of the present invention without departing from the scope or spirit of the invention. In view of the foregoing, it is intended that the present invention cover modifications and variations of this invention provided they fail within the scope of the following claims and their equivalents. Furthermore, the term "a", "an" or "one" recited herein as well as in the claims hereafter may refer to and include the meaning of "at least one" or "more than one".

What is claimed is:

1. An image-based object tracking system, comprising:
  a controller, the controller comprising two or more color clusters;
  a camera, configured to capture real-time images of the controller; and
  a processing unit, for receiving the real-time images of the controller and executing an object tracking algorithm so as to provide real-time display of processed image contents from the captured images of the controller on a monitor screen;
  wherein the processing unit configured for:
    performing color learning on the controller using a learning box and a color learning algorithm;
    upon determining color learning being successful, storing the color learning results of the controller, and starting object tracking of the controller using the color learning results; and
    upon determining that color relearning of the controller is required, repeating the performing color learning step, otherwise showing a learning error message;
    capturing images of the controller;
    separating and splitting the controller and the background by color differences using the color learning results;
    providing color labeling and color filtering to the controller and the background; and
    performing an object pairing procedure on the controller, and upon determining that the object pairing of the controller is successful, performing output of the object features of the controller;
  wherein the controller is configured to be directly interacting with the displayed processed image content on the monitor screen.

2. The image-based object tracking system of claim 1, wherein the controller having three side color clusters located on a side surface thereof and two top color clusters having concentric circular areas located at a top surface thereof, the three side color clusters are respectively arranged in order next to one another, and the color of the first side color cluster is the same as the color of the third side color cluster.

3. The image-based object tracking system of claim 1, wherein the colors for the color clusters are green and blue.

4. The image-based object tracking system of claim 1, wherein the colors for the color clusters are configured in an alternating manner or a different and distinct manner.

5. The image-based object tracking system of claim 1, wherein the controller having two side color clusters located on a side surface thereof and two top color clusters having concentric circular areas located at a top surface thereof.

6. The image-based object tracking system of claim 5, wherein a tip is defined at the top surface portion of the controller, each of the two top color clusters disposed at the top surface portion of the controller has a concentric circular shape of a different radius and color.

7. The image-based object tracking system of claim 1, wherein the controller further comprises a plurality of motion sensors configured in the controller, and the controller is thereby equipped to provide detection of rotational movements around yaw, pitch, and roll directions.

8. The image-based object tracking system of claim 1, wherein dual cameras are configured in the image-based object tracking system to calculate the depth information of the tracked controller and the spatial translation of the controller along x, y and z axes of entire 3D space.

9. An object tracking method, comprising the steps of performing color learning on a first controller using a learning box and a color learning algorithm;

upon determining color learning being successful, storing the color learning results of the first controller, determining if there are more than one controller, and if so, configuring the total number of controllers to be N, and performing color learning on each controller using the learning box and the color learning algorithm, and upon determining color learning being successful on the Nth controller, storing the color learning results, and starting object tracking of each controller using the color learning results; and upon determining that color relearning of each controller is deemed to be required, repeating from the performing color learning step, otherwise showing a learning error message;

capturing images of each controller;

separating and splitting each controller and the background by color differences using the color learning results;

providing color labeling and color filtering to each controller and the background;

performing an object pairing procedure on each controller, and upon determining that the object pairing of each controller is successful, performing output of the object features of each controller; and performing scale calibration upon determining that scale calibration is required.

10. The object tracking method of claim 9, wherein prior to color learning on the controller, the exposure or white balance of the camera is controlled to maintain stability of the background of the captured image when the illumination in the image environment changes, the object pairing is capable of pairing together the tip and a body portion, and the body portion is defined as the remaining part of the controller which is not the tip.

11. The object tracking method of claim 9, upon determining that scale calibration is not required, wherein the object pairing procedure comprising steps of:

starting a pairing procedure of the tip and a body part of each controller;

searching for all of the color clusters in a captured image;

pairing together the color clusters by checking for geometry features and correlations;

upon determining that the pairing of the color clusters is successful, and upon determining that there is more than one pair of the color clusters is to be paired together, labelling the paired objects by learning order sequence, output the features of the objects;

upon determining the pairing of the color cluster is not successful, capturing images of the controller by using the camera; and upon determining that there is not more than one pair of the color clusters, outputting the object features.

12. The object tracking method of claim 11, wherein the controller is recognized and identified during object tracking according to the features of one or mote of pairings of the top color clusters, wherein a plurality of centroids of the top color clusters are evaluated by constructing a plurality of circumscribed rectangles with respect to the top color clusters, and designating half of the diagonal distances of each of the respective circumscribed rectangles for the top color clusters, and determining whether the centroid of one top color cluster is inside an another top color cluster by the following equations:

$$C1 = \beta * C2, \text{ where } 0.5 < \beta < 1,$$

$$\sqrt{(Ax-Bx)^2 = (Ay-By)^2} < C2.$$

where C1 is half of a diagonal distance of a circumscribed rectangle for the one top color cluster, C2 is half of a diagonal distance of a circumscribed rectangle for the another top color cluster; $\beta$ is a coefficient value between 0.5 and 1, A' is defined as the centroid of the one top color cluster and has the coordinates of (Ax, Ay); B' is defined as the centroid of the another top color cluster and has the coordinates of (Bx, By); Ax and Ay are the x and y coordinates of the centroid of the one top color cluster in an (x, y) coordinate system; Bx and By are the x and y coordinates of the centroid of the one top color cluster in an (x, y) coordinate system.

13. The object tracking method of claim 12, wherein a position of the tip of the controller is determined according to a height differences of the color clusters.

14. The object tracking method of claim 12, wherein the controller is recognized and identified during object tracking according to the geometry features of one or more of pairings of the color clusters, the pairings of the color clusters, and ensuring that a summation total of the number of pixels that are substantially the same color as the stored color features from the color learning results for each of a plurality of suspected color clusters are obtained; the summation total of the pixels for the suspected color clusters are tabulated and compared.

15. The object tracking method of claim 14, wherein a successful pairing of a pair of the color clusters is achieved based on the condition that the distance between the centroids of the compared suspected color clusters is less than the summation of the heights thereof and that the summation total of the pixels of one suspected color cluster is approximately equal to the summation total of the pixels of another suspected color cluster used in the comparison; a failed pairing of the color clusters is defined based on the condition that the distance between the centroids of compared suspected color clusters is larger than the summation of the heights thereof, and that the summation total of the pixels of one suspected color cluster being of a background color camouflage region is much less than the summation total of the pixels of an another suspected color cluster being of a color cluster, upon completion of pairing comparison, two color clusters are paired together, whereas the background color camouflage region is rejected.

16. The object tracking method of claim 9, wherein a scale calibration procedure for performing the scale calibration step without dual cameras comprising steps of:
   starting a scale calibration procedure;
   locating a position of an extremity portion of the controller in the captured image;
   performing scaling calculation based on the extremity position data; and
   performing a position mapping, in which the original position of the extremity portion of the controller is compared with the mapping position thereof after scale calibration is performed.

17. The object tracking method of claim 9, wherein a scale calibration procedure for use with dual cameras in performing the scale calibration step comprising steps of:
   starting a scale calibration procedure;
   locating the position of an extremity portion of the controller in the captured image;
   performing scaling calculation based on the extremity position data and a depth information obtained from the dual cameras; and
   performing a position mapping, in which the original position of the extremity portion of the controller is compared with the mapping position thereof after scale calibration is performed.

18. The object tracking method of claim 15, wherein the successful pairing of the pair of adjacent color clusters is further dependent upon the summation total of the pixels of one color cluster being approximately equal to the summation total of the pixels of the other color cluster used in the pairing comparison, the distance between the centroids of adjacent color clusters are substantially equal, and summation of the distances between the centroids of adjacent color clusters are substantially equal to the distance between the centroids between the farthest locating color clusters.

19. The object tracking method of claim 15, wherein cluster pairing is performed based on the following equations:

$$\overline{C'D'} \approx \overline{B'C'}$$

$$\overline{B'C'} + \overline{C'D'} \approx \overline{B'D'}$$

$$\theta = \cos^{-1}\left(\frac{\overrightarrow{C'B'} \cdot \overrightarrow{D'C'}}{|\overrightarrow{C'B'}| \cdot |\overrightarrow{D'C'}|}\right) < \pm 10°$$

where $\overline{C'D'}$ is the distance between the centroid of a second side color cluster and the centroid of a third side color cluster; $\overline{B'C'}$ is the distance between the centroid of a first side color cluster and the centroid of the second side color cluster; $\overline{B'D'}$ is the distance between the centroid of the first side color cluster and the centroid of the third side color cluster; the arrowed line→above C'B' represent a line vector constructed from the centroid of the second side color cluster to the centroid of the first side color cluster; the arrowed line→above D'C' represent the line vector constructed from the centroid of the third side color cluster to the centroid of the second side color cluster; the angle $\theta$ is an enclosed angle formed between the C'B' line vector and the D'C' line vector.

20. An object tracking method, comprising the steps of:
performing color learning on a controller using a learning box and a color learning algorithm;
upon determining color learning being successful, storing the color learning results of the controller, and starting object tracking of the controller using the color learning results; and
upon determining that color relearning of the controller is required, repeating the performing color learning step, otherwise showing a learning error message;
capturing images of the controller;
separating and splitting the controller and the background by color differences using the color learning results;
providing color labeling and color filtering to the controller and the background; and
performing an object pairing procedure on the controller, and upon determining that the object pairing of the controller is successful, performing output of the object features of the controller.

\* \* \* \* \*